(12) United States Patent
Christmas et al.

(10) Patent No.: US 12,742,977 B2
(45) Date of Patent: Sep. 22, 2026

(54) IMAGE PROJECTION

(71) Applicant: Dualitas Ltd, Milton Keynes (GB)

(72) Inventors: Jamieson Christmas, Milton Keynes (GB); Máté Karner, Milton Keynes (GB); Ruisheng Lin, Milton Keynes (GB); Timothy Smeeton, Milton Keynes (GB)

(73) Assignee: Dualitas Ltd, Milton Keynes (GB)

( * ) Notice: Subject to any disclaimer, the term of this patent is extended or adjusted under 35 U.S.C. 154(b) by 656 days.

(21) Appl. No.: 18/042,759

(22) PCT Filed: Feb. 2, 2022

(86) PCT No.: PCT/EP2022/052498
§ 371 (c)(1),
(2) Date: Feb. 23, 2023

(87) PCT Pub. No.: WO2022/167492
PCT Pub. Date: Aug. 11, 2022

(65) Prior Publication Data
US 2023/0324705 A1 Oct. 12, 2023

(30) Foreign Application Priority Data
Feb. 5, 2021 (GB) ..................................... 2101667

(51) Int. Cl.
*G02B 27/42* (2006.01)
*G02B 27/01* (2006.01)
(Continued)

(52) U.S. Cl.
CPC ..... *G02B 27/4205* (2013.01); *G02B 27/0172* (2013.01); *G02F 1/0338* (2013.01);
(Continued)

(58) Field of Classification Search
USPC ............................................. 359/566; 349/25
See application file for complete search history.

(56) References Cited

U.S. PATENT DOCUMENTS

2002/0109819 A1* 8/2002 Tuval ................ G02B 27/0172 351/206
2012/0002256 A1 1/2012 Lacoste et al.
(Continued)

FOREIGN PATENT DOCUMENTS

GB 2574823 A 12/2019
JP H1124120 A 1/1999
(Continued)

OTHER PUBLICATIONS

International Search Report and Written Opinion in PCT/EP2022/052498, mailed May 13, 2022.
(Continued)

*Primary Examiner* — Dung T Nguyen
(74) *Attorney, Agent, or Firm* — McDonnell Boehnen Hulbert & Berghoff LLP

(57) ABSTRACT

A diffractive structure arranged to spatially modulate light transformable by a viewing system into a target image. The diffractive structure is configured to generate a plurality of discrete light patterns. Each light pattern corresponds to a different part of the target image. The shape of each discrete light pattern substantially corresponds to the shape of an entrance aperture of the viewing system.

18 Claims, 25 Drawing Sheets

(51) Int. Cl.

*G02F 1/03* (2006.01)
*G02F 1/135* (2006.01)
*G02B 27/00* (2006.01)
*G02B 27/09* (2006.01)

(52) U.S. Cl.

CPC .......... *G02F 1/135* (2013.01); *G02B 27/0068* (2013.01); *G02B 27/0081* (2013.01); *G02B 27/0093* (2013.01); *G02B 27/0103* (2013.01); *G02B 27/0955* (2013.01)

(56) References Cited

U.S. PATENT DOCUMENTS

| | | | |
|---|---|---|---|
| 2012/0224062 | A1 | 9/2012 | Lacoste et al. |
| 2013/0050790 | A1 | 2/2013 | Sung |
| 2013/0063815 | A1 | 3/2013 | Kubota |
| 2013/0222384 | A1 | 8/2013 | Futterer |
| 2016/0238845 | A1 | 8/2016 | Alexander et al. |
| 2018/0120563 | A1 | 5/2018 | Kollin |
| 2019/0212557 | A1 | 7/2019 | Waldern et al. |
| 2020/0209627 | A1 | 7/2020 | Roggatz |

FOREIGN PATENT DOCUMENTS

| | | | |
|---|---|---|---|
| JP | 2014-503836 | A | 2/2014 |
| JP | 2018136573 | A | 8/2018 |
| JP | 2020-516959 | A | 6/2020 |
| WO | 2019/096989 | A1 | 5/2019 |

OTHER PUBLICATIONS

Combined Search and Examination Report in United Kingdom, Patent Application No. GB2101667.0, dated Aug. 2, 2021.

Notice of Reasons for Rejection from Korean Application No. 10-2023-7013381, dated Jul. 22, 2024.

* cited by examiner

905

906

G1

M

G2

904

Y

Z

IMAGE PROJECTION

CROSS-REFERENCE TO RELATED APPLICATIONS

The present application is a U.S. National Stage application of International Patent Application no. PCT/EP2022/052498, filed Feb. 2, 2022, which claims the benefit of priority of United Kingdom Patent Application no. 2101667.0, filed Feb. 5, 2021.

FIELD

The present disclosure relates to image projection. More specifically, the present disclosure relates to a diffractive structure and method for determining a diffractive structure such as a hologram or kinoform. Some embodiments relate to real-time hologram calculation based on eye-tracking information. Some embodiments relate to virtual image projection. Other embodiments relate to projection of a real image. Embodiments relate to viewing a projected image through a waveguide. Some embodiments relate to a light engine such as a picture generating unit. Some embodiments relate to a head-up display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e., is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and light detection and ranging, "LIDAR", for example.

SUMMARY

Aspects of the present disclosure are defined in the appended independent claims.

The present disclosure and drawings generally show one-dimensional cases for ease of explanation and illustration. However, the person skilled in the art of optics will appreciate that the concepts described and shown may extend in two-dimensions to provide two-dimensional images from two-dimensional holograms. For example, whilst only one-dimensional pupil expansion may be described and shown, the reader should appreciate that the present disclosure extends to two-dimensional pupil expansion—e.g. using two one-dimensional pupil expanders in series.

The present disclosure relates to image projection. It relates to a method of image projection and an image projector which comprises a display device. The present disclosure also relates to a projection system comprising the image projector and a viewing system. The present disclosure is equally applicable to a monocular and binocular viewing system. The viewing system may comprise a viewer's eye or eyes. The viewing system comprises an optical element having optical power (e.g. lens/es of the human eye) and a viewing plane (e.g. retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. The image is formed by illuminating a diffractive pattern (e.g. hologram) displayed on the display device. The present disclosure further relates to providing (e.g. calculating) a diffractive pattern for image projection, and to the diffractive pattern.

The display device comprises pixels. The pixels of the display device diffract light. In accordance with well-understood optics, the magnitude of the maximum diffraction angle is determined by the size of the pixels (and other factors such as the wavelength of the light).

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In embodiments, the image is a real image. In other embodiments, the image is a virtual image that is perceived by a human eye (or eyes). The projection system, or light engine, may thus be configured so that the viewer looks directly at the display device. In such embodiments, light encoded with the hologram is propagated directly to the eye(s). This light may be referred to as being "spatially modulated" or "holographic light". In such embodiments, there is no intermediate holographic reconstruction formed, either in free space or on a screen or other light receiving surface, between the display device and the viewer. In such embodiments, the pupil of the eye may be regarded as being the entrance aperture of the viewing system and the retina of the eye may be regarded as the viewing plane of the viewing system. It is sometimes said that, in this configuration, the lens of the eye performs a hologram-to-image conversion.

In accordance with the principles of well-understood optics, the range of angles of light propagating from a display device or viewing window that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g. any one eye position within a viewing window such as eye-motion box.)

In some embodiments, the image perceived by a viewer is a virtual image that appears upstream of the display device—that is, the viewer perceives the image as being further away from them than the display device. Conceptually, it is possible to consider a plurality of different virtual image points of a virtual image. The distance from a virtual point to the viewer is referred to herein as a virtual image distance, for that virtual image point. Different virtual points may, of course, have different virtual image distances. Individual light rays, within ray bundles associated with each virtual point, may take different respective optical paths to the viewer, via the display device. However, only some parts of the display device, and therefore only some of the rays from one or more virtual points of a virtual image, may be within the user's field of view. In other words, only some of the light rays from some of the virtual points on the virtual image will propagate, via the display device, into the user's eye(s) and thus will be visible to the viewer. Conceptually, it may therefore be considered that the viewer is looking at a virtual image through an 'display device-sized window', which may be very small, for example 1 cm in diameter, at a relatively large distance, e.g. 1 metre. And the user will be viewing the display device-sized window via the pupil(s) of their eye(s), which can also be very small. Accordingly, the field of view becomes small and the specific angular range that can be seen depends heavily on the eye position, at any given time.

It is often desirable for an optical system to be physically small—for example, when it is implemented in a location in which space is limited and/or real-estate value is high. However, physical constraints typically are associated with functional limitations. For example, in conventional optical systems, using a small display device is typically associated with having a limited field of view (FOV), thus restricting the visibility of images. The present disclosure addresses a technical problem of how to increase the field of view—i.e., how to increase the range of angles of light rays that are propagated from the display device, and which can successfully propagate through an eye's pupil to form an image—when the display device is (in relative terms) small, and the projection distance is (in relative terms) large. In some embodiments, the projection distance is at least one—such as, at least two—orders of magnitude greater than the diameter, or width, of the aperture of the display device (i.e., size of the array of pixels). More specifically, the present disclosure addresses a technical problem of how to do this with so-called direct view holography in which a hologram of an image is propagated to the human eye rather than the image itself. In other words, the light received by the viewer is "holographic light" that has been spatially modulated according to a hologram of the image.

A pupil expander, is used to expand the field of view and therefore increase the maximum propagation distance over which the full diffractive angle of the display device may be used. Use of a waveguide can also increase the user's eye-box laterally, thus enabling some movement of the eye(s) to occur, whilst still enabling the user to see the image. In embodiments, the pupil expander is a waveguide pupil expander. The present disclosure generally (but not exclusively) relates to non-infinite virtual image distances—that is, near-field virtual images.

The present inventors have found that, for conventional holography for a non-infinite virtual image distance—that is, near-field virtual images, so-called 'ghost images' appear. This can be caused by the different possible light propagation paths through the waveguide. A ghost image is a lower intensity replica of a main image. The main, highest intensity image may be referred to as the primary image. Each ghost image may be referred to as a secondary image. The presence of ghost images can significantly reduce the quality of a perceived virtual image. The ghost images may give the appearance of blurring of the primary image.

Aspects of the present disclosure relate to different approaches for addressing problems caused by the ghost images. Some solutions disclosed herein have been shown to successfully remove, or to prevent the formation of, ghost images. Some solutions disclosed herein have been shown to modify/manipulate the ghost image in order to enhance or reinforce the primary/non-ghost image.

According to aspects of the present disclosure, a light engine is arranged to provide a viewing system, having an entrance pupil, with spatially modulated light. The display system comprises a display device arranged to display a hologram and spatially modulate light in accordance with the hologram. The display system further comprises a hologram engine arranged to output a hologram for display on the display device, to enable the viewing system to see or perceive an image of a target image or object at a particular location. A pupil expander is provided and may be arranged relative to the display device to ensure that the viewing system receives light corresponding to the entire image (I.e., to provide the maximum field of view) without being required to change the position of the entrance pupil.

There is disclosed herein a method of determining a diffractive structure of an image for a system comprising a display device and viewing system. The diffractive structure may be a hologram and the term "hologram" is used henceforth merely as an example of a diffractive structure in accordance with this disclosure. The diffractive structure may be a complex hologram, phase-only hologram or kinoform. The display device is arranged to display the hologram. The viewing system is arranged to view the hologram through a pupil expander. The pupil expander provides a plurality of light propagation paths from the display device to the viewing system.

According to aspects of the present disclosure, a hologram is provided (e.g., calculated) that causes a display device on which the hologram is displayed to, when suitably illuminated, output channels of spatially modulated light. At least in some arrangements, each channel corresponds to a respective continuous area of the image that is represented by the hologram. Each channel may correspond to a different continuous part or area of the image, such that the channels combine to provide holographic light of the entire image. A pupil expander may be provided between the display device and a viewing system, the pupil expander being arranged to direct each channel to an entrance aperture of the viewing system. Each channel may be regarded as having a unique respective central axis, which defines a primary (or, "core") direction of travel of that channel, relative to the display device, for example, relative to a central point or to another reference point on a light emitting face of the display device. The reader will therefore understand that each channel may be characterized by an axis which may be the considered the optical axis or propagation axis of the channel. Each axis may be characterized by a unique angle relative to the normal of the display device. Each axis may be a straight line joining the centre of the display device (or hologram) to the centre of the illumination area or light pattern of the channel (that is, the centre of the cross-sectional area of the light channel).

The cross-sectional area of one or more of the channels may have a size and/or shape that corresponds with the size and/or shape of the entrance aperture of the viewing system. For example, if the entrance aperture is a human eye, the channels may be substantially elliptical or oval-shaped in cross-section. In embodiments that include hologram calculations, the calculation process may include limiting or cropping the hologram in accordance with the size and/or shape of the entrance aperture and/or in accordance with the size and/or shape of the display device.

In some embodiments, there is no overlap between in the channels in terms of image content. In other embodiments, there is some overlap between the channels in terms of image content. This overlap is partial and relatively small. For example, two adjacent channels may both contain some information about the same part of the image. It may therefore be said that the channels may partially overlap—in terms of image content/space angles in the field of view.

It is possible to characterize channels in terms of angles in the field of view. These angles may be measured from the normal of the display device/hologram. Each channel may be characterized by two angles—for example, a first angle on a xz plane and a second angle of a yz plane, wherein the z-direction is perpendicular to the display device/hologram and represents the general light propagation direction from the hologram. The x-direction may be the horizontal and the y-direction may be vertical. For example, in the x-direction (horizontal field of view), a first channel may correspond to the angular range 0 to +4 degrees and a second angle may relate to +3 to +7 degrees. In this example, an overlap of 1 degree exists. In this example, the first channel and second channel both contain information related to the angular content of image or angles of the horizontal field of view in the range +3 to +4 degrees. Both channels contain additional information, of course. The overlap is relatively small—for example, no more than 25% of the angular range associated with each channel such as no more than 10%.

In some embodiments, the magnitude of the total angular range (not just the overlapping angular range) associated with each channel is the same. In other embodiments, the magnitude of the angular range associated with one angular channel is different to that of another.

There is disclosed herein a method of calculating a hologram of an image, the method comprising at least one step including cropping in accordance with the entrance pupil of the viewing system to form a hologram that, when illuminated, forms spatially modulated light, wherein continuous light channels of the spatially modulated light correspond with continuous regions of the image. A continuous light channel may be defined by a continuous range of light ray angles of the spatially modulated light. All pixels of the hologram contribute to each channel, such that light rays that contribute to each channel may be emitted from multiple different pixels of the display device, on which the hologram is displayed and illuminated. Those light rays combine to form a continuous channel, wherein each channel has a unique respective primary direction of propagation, relative to the display device. A core or axis may be defined, in the propagation direction, for each channel. For each individual hologram pixel, light of the different respective channels will be output from that pixel at different respective angles.

Each continuous light channel of the spatially modulated light corresponds with a respective continuous region of the image. The spatially modulated light may be divided into any number of continuous light channels. In some embodiments, the light channels are non-overlapping. In other embodiments—for example, those additionally including an optical combiner having optical power (e.g. vehicle windscreen) between the waveguide and viewer—some light channels may at least partially overlap. The method disclosed herein determines a diffractive structure arranged to spatially modulate light transformable by a viewing system into an image, wherein the diffractive structure is configured to route light into a plurality of hologram channels, each hologram channel corresponding to a different part of the image.

For the avoidance of doubt, the image formed or perceived by the viewer is a holographic reconstruction of a target image. The holographic reconstruction is formed from a hologram based on the target image. In some embodiments, the hologram is determined (e.g. calculated) from the target image.

The hologram may be calculated using any suitable technique. Several possible hologram calculation techniques are disclosed herein, however the present disclosure is not limited to the examples provided. According to some embodiments, the hologram may be calculated using a modelling technique, such as a ray tracing technique, such as a so-called "point-cloud" hologram calculation technique. In such embodiments, the hologram engine may be arranged to receive contribution information identifying contributory and non-contributory areas of the display device based on the location of the entrance pupil. The contributory areas of the display device substantially propagate light passing through the entrance pupil at the determined location. The non-contributory areas of the display device substantially propagate light stopped by the entrance pupil at the determined location. The contribution information further identifies (i) at least one primary contributory area of the display device propagating light to the viewing system that contributes to a primary image and (ii) at least one secondary contributory area of the display device propagating light to the viewing system that contributes to a secondary image. The hologram engine is further arranged to determine a hologram based on the at least one primary contributory area of the display device identified by the processing engine. The hologram engine is further arranged to output the hologram to the display device for display.

By identifying contributory and non-contributory areas of the display device, the light engine can determine which part or parts of the display device can usefully be encoded by the hologram, in order to contribute positively to formation of the primary image, for a given location of the entrance aperture of the viewing system. For example, this may correspond to a location of a viewer's eye, at a given time. Moreover, the light engine can determine which parts of the display device cannot propagate light through the entrance aperture, and thus are not worth populating with hologram values. In addition, the light engine can distinguish between parts of the display device that contribute positively to a 'main' target image and parts which contribute to a copy/replica or 'ghost' version of the primary image. The hologram can thus be omitted in so-called secondary contributory areas, to eliminate the ghosts.

Alternatively, in a notable further improvement, the hologram displayed in an additional contributory area may be determined, based on a displaced or amended location of an image point (i.e., of a point within a desired image, that is to be holographically reconstructed). This amended location may be referred to as being a 'secondary image point' but this is shorthand for it being a secondary (i.e., changed) location of the (primary) image point. In brief, a modelled/computed location of an image point may be amended (e.g., translated on an image plane) so that light travelling from said amended location, via the additional contributory area on the display device, would arrive at a desired location on a viewing plane, in order to effectively reinforce the primary image. Therefore, in this alternative approach, the hologram for the additional contributory area is determined based on a different location of the image point to that which is used to identify a primary contributory area on the display device. The optical path length, from the primary image point, is typically different to the optical path length, from the secondary image point, to the corresponding image that is formed on the viewing plane. It may thus be said that the hologram determination process in relation to the additional contributory area comprises translating or shifting the image point used in the hologram determination process.

Thus, an intelligent and efficient light engine is provided, which can be configured and operate to provide sharp, accurate images, corresponding to holograms that have been determined in a streamlined and computationally efficient manner.

A method is provided of determining a hologram for display on a display device. The method comprises determining the location of the entrance pupil of a viewing system arranged to view the hologram and identifying contributory areas and non-contributory areas of the display device, wherein the contributory areas of the display device substantially propagate light passing through the entrance pupil of the viewing system at the determined location and non-contributory areas of the display device substantially propagate light stopped by the entrance pupil of the viewing system at the determined location. The method further comprises identifying at least one primary contributory area of the display device that provides light contributing to a primary image and at least one secondary contributory area of the display device that provides light contributing to a secondary image; and determining the hologram based on the at least one primary contributory area of the display device.

A diffractive structure is provided, arranged to spatially modulate light transformable by a viewing system into a target image, wherein the diffractive structure is configured to generate a plurality of discrete light patterns, each light pattern corresponding to a different part of the target image, wherein the shape of each discrete light pattern substantially corresponds to the shape of an entrance aperture of the viewing system.

A diffractive structure is provided, arranged to spatially modulate light transformable by a viewing system (comprising a lens) into an image, wherein the diffractive structure is arranged to direct light into a plurality of discrete light channels, wherein each light channel has a cross-sectional shape substantially corresponding to an entrance pupil of the viewing system and each light channel substantially corresponds to a different part of the image.

A method is provided of determining a hologram for display on a display device and formation of a virtual image perceivable from a viewing plane by viewing a hologram displayed on the display device through a waveguide. The method comprises, for each virtual image point of the virtual image, determining the coordinates of the virtual image point, $[x_{virtual}, y_{virtual}, z_{virtual}]$, determining a viewing position on the viewing plane, and determining a number of light reflections, B, within the waveguide associated with a primary image formed by the waveguide. The method further comprises ray tracing from the virtual image point to the viewing plane for 'B' light reflections within the waveguide and determining coordinates, $[x_{LCOS}(B), y_{LCOS}(B)]$, of a chief light ray at the display device for light propagation from $[x_{virtual}, y_{virtual}, z_{virtual}]$ to the viewing plane with B reflections. The method further comprises determining active pixels of display device within an area defined by $[x_{LCOS}(B), y_{LCOS}(B)]$; and determining a sub-hologram comprising an amplitude and/or phase hologram component for the active pixels by propagating a light wave from $[x_{virtual}, y_{virtual}, z_{virtual}]$ to the active pixels.

The chief ray may comprise a light ray that is determined (e.g., computed or modelled) as travelling from the virtual image point, via the display device, to a primary or 'main' image point, of the virtual image point, on the viewing plane.

The method may further comprise combining the sub-holograms—calculated respectively for two or more corresponding virtual image points—in order to form a hologram.

The method may further comprise determining a position on the viewing plane, $[x_{sensor}, y_{sensor}]$, of the main image of the virtual image point.

The method may further comprise, for each value of ΔB permitted by the waveguide, ray tracing back from $[x_{sensor}, y_{sensor}]$ to a virtual image plane $z_{virtual}$ for B+ΔB bounces and determining virtual point coordinates, $[x_{virtual}(\Delta B), y_{virtual}(\Delta B), z_{virtual}]$, that will image to $[x_{sensor}, y_{sensor}]$ for B+ΔB reflections. The method may further comprise determining the coordinates, $[x_{LCOS}(B+\Delta B), y_{LCOS}(B+\Delta B)]$, of a chief ray at the display device for light propagation from $[x_{virtual}(\Delta B), y_{virtual}(\Delta B), z_{virtual}]$ to the viewing plane with B+ΔB bounces and identifying additional active pixels of the display device within a second area (i.e., an additional area) that is defined by $[x_{LCOS}(B+\Delta B), y_{LCOS}(B+\Delta B)]$. The method may further comprise determining an additional sub-hologram comprising an amplitude and/or phase hologram component for the additional active pixels by propagating a light wave from $[x_{virtual}(\Delta B), y_{virtual}(\Delta B), z_{virtual}]$ to the additional active pixels.

According to some embodiments, the hologram may be calculated by determining complex light fields, wherein the method may be iterative. According to an embodiment, the method comprises first to fifth stages. The first stage comprises determining a first complex light field at an entrance pupil of the viewing system. The first complex light field results from the propagation of light from a display plane of the display device along at least one light propagation path of the pupil expander. The first stage also comprises cropping in accordance with the entrance pupil of the viewing system. The second stage comprises determining a second complex light field at a sensor plane of a sensor of the viewing system. The second complex light field results from the propagation of light of the first complex light field from the entrance pupil through a lens of the viewing system. The second stage also comprises modifying the amplitude component in accordance with the image. The third stage comprises determining a third complex light field at the entrance pupil. The third complex light field results from the reverse propagation of light of the second complex light field from the sensor plane back through the lens. The third stage also comprises cropping in accordance with the entrance pupil. The fourth stage comprises determining a fourth complex light field at the display plane. The fourth complex light field results from the propagation of light of the third complex light field back along the at least one light propagation of the pupil expander. The fourth stage also comprises cropping in accordance with the display device. The hologram is extracted from the fourth data set. The first to fourth steps may be iteratively repeated. The hologram converges, and likely improves, with each iteration but does plateau. The method may stop when the hologram extractable from the fourth stage is deemed of acceptable quality or the rate of change with each iteration is below a threshold value or an allotted time has expired, for example. For the avoidance of doubt, the hologram that is extracted is the hologram for display on the display device.

The term "reverse propagation" is merely used to reflect that the propagation direction of light in the third and fourth stages is different or substantially opposite to that in the first and second stages. In this respect, the light propagation in the first and second stages may be termed "forward propagation". In some embodiments, the "forward propagation" and "reverse propagation" are a mathematical inverse of each other.

The term "cropping" is used herein to refer to a process of selectively discarding information, such as light field information, outside an area or region of interest, such as outside a light aperture. In some embodiments, "cropping" is a data processing step comprises discarding data points, or zeroing data points or simply ignoring data points, outside the aperture.

Reference is made herein to a "complex light field". The term "light field" merely indicates a pattern of light having a finite size in at least two orthogonal spatial directions, x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field. In accordance with the method disclosed herein, the complex light field is propagated forward and back in the +z and −z directions between a hologram plane and an image plane. Light propagation can be simulated or modelled using any one of a number of different approaches or mathematical transforms familiar to the person skilled in the art of wave optics.

The inventors have devised method(s) of determining a hologram for a relatively small display device and projection over a relatively long distance, wherein the hologram is projected directly to the viewing system/s and the method is capable of implementation in real-time. The relatively small size of the display device and relatively long projection distance may necessitate a pupil expander. The method devised by the inventors also addresses the optical complications introduced by using a pupil expander. At least in some embodiments, the method yet further allows image content to appear at different distances from the viewing system/s and/or plural distances, optionally, at the same time—e.g. using one hologram. Yet further still, the method allows image content to appear downstream of the display device and upstream of the display device, optionally, at the same time—e.g. using one hologram.

Importantly, light of the hologram itself (I.e., holographic light) is propagated to the viewing system/s—not a holographic reconstruction (i.e., an image) formed from the hologram. It may be said that the spatially modulated light received by the viewing system/s is in the hologram domain rather than the spatial or image domain. It may also be said that the viewing system/s performs the hologram to image transform. More specifically, an optical element such as lens of each viewing system performs the transformation. In embodiments, a holographic reconstruction or image is not formed between the display device and viewing system/s. In some embodiments, a different hologram is calculated and propagated to each eye of a viewer, optionally, using an interlacing scheme.

The display device has an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

The methods disclosed herein form a hologram configured to route light into a plurality of channels, each channel corresponding to a different part (i.e., sub-area) of an image. The hologram may be represented, such as displayed, on a display device such as a spatial light modulator. When displayed on an appropriate display device, the hologram may spatially modulate light transformable by a viewing system into the image. The channels formed by the diffractive structure are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram.

The hologram is described herein as routing light into a plurality of hologram channels merely to reflect that the image reconstructable from the hologram has a finite size and can be arbitrarily divided into a plurality of image sub-areas, wherein each hologram channel would correspond to a respective image sub-area. Importantly, the hologram of this disclosure is characterised by how it distributes the image content when illuminated. Specifically, the hologram divides the image content by angle. That is, each point on the image is associated with a unique light ray angle, or range of angles, in the spatially modulated light formed by the hologram when illuminated—at least, a unique pair of angles or range of angles because the hologram is two-dimensional That is, each point of a target/desired image can be associated with a light channel formed by the hologram that reconstructs the image. More specifically, the image content or information associated with each image point is encoded within a corresponding channel. Unless there is some overlap as described above, each image point (or continuous range of image points forming a sub-area of the image) is uniquely associated with a corresponding light channel. Each part of an image can therefore be associated with an angle (or pair of angles) defining an axis of a discrete light channel formed by the hologram. For the avoidance of doubt, this hologram behaviour is not conventional. The spatially modulated light formed by this special type of hologram, when illuminated, may be arbitrarily divided into a plurality of hologram channels. It will be understood from the foregoing that any hologram that may be considered in the spatially modulated light will be associated with a respective part or sub-area of the image. That is, all the information needed to reconstruct that part or sub-area of the image is contained within a channel of the spatially modulated light formed from the hologram of the image. When the spatially modulated light is observed as a whole, there is not necessarily any evidence of a plurality of discrete light channels. However, in some embodiments, a plurality of spatially separated hologram channels is formed by intentionally leaving areas of the target image, from which the hologram is calculated, blank or empty (i.e., no image content is present).

Nevertheless, the hologram may still be identified. For example, if only one hologram channel—I.e., only one continuous part or sub-area of the spatially modulated light formed by the hologram—is reconstructed, only one respective sub-area of the image should be visible. If a different hologram channel—I.e., a different continuous part or sub-area of the spatially modulated light—is reconstructed, a different respective sub-area of the image should be visible. A further identifying feature of this type of hologram is that the shape of the cross-sectional area of any hologram channel substantially corresponds to (e.g., is substantially the same as) the shape of the entrance pupil although the size may be different—at least, at the correct plane for which the hologram was calculated. Each light hologram channel propagates from the hologram at a core (or, axial) direction. Whilst these are example ways of characterising or identifying this type of hologram, other ways may be used. In summary, the hologram disclosed herein is characterised and identifiable by how the image content is distributed within light encoded by the hologram, and the appended claims are set out accordingly.

The method may comprise dividing the image up during hologram calculation such that the number of light channels formed by the hologram—and therefore the spacing between light channels—is synergistic with the replication process described herein. In some embodiments, each channel uniquely corresponds to a number of bounces of reflections within a waveguide. For example, a first channel may correspond to zero "bounces", a second channel may correspond to one "bounce" and so on.

There are many technical advancements provided by the method disclosed herein. Firstly, the method does not form ghost images that may be formed by other methods. This is because the method inherently ensures that the right image content gets to the right place by fully considering all possible light propagation paths in the waveguide. Secondly, at least in some embodiments, the method can present image content at any depth plane unlike other methods which can be poor when the image point distance is very small. This is a significant problem in optical systems utilising an optical combiner having optical power—such as a vehicle windscreen—to form a virtual image. Thirdly, the method inherently accounts for the effects of wavelength such that in a colour projector comprising a plurality of single-colour holographic channels there is no need for image size correction by wavelength such as disclosed in U.S. Pat. No. 10,514,658.

The different propagation paths of the hologram channels may pass through the entrance aperture of the viewing system at different respective angles. The pupil expander may be arranged so that all hologram channels are routed through the entrance aperture of the viewing system at any viewing position on a viewing plane. The pupil expander only routes each hologram channel via one propagation path to the viewing system for each permitted viewing position. At least two hologram channels of the plurality of hologram channels may be partially overlapping at the entrance aperture of the viewing system.

In embodiments in which the method comprises first to fifth stages, the first to fourth stages may be ordered stages. The method disclosed operates by projecting back and forth between the image plane and hologram, and the method may begin at the image plane or the hologram plane. The amplitude component of the light field after each propagation to the image plane or hologram plane is modified or constrained but the phase component is preserved. In some embodiments, the method starts with the first stage which equates to starting at the hologram plane. However, in other embodiments, the method starts with the third stage which equates to starting at the image plane. In these other embodiments, the third stage is followed by the fourth stage. The fourth stage is followed by the first stage and the first stage is followed by the second stage. Each stage may be performed once before hologram extraction or at least some stages may be performed a plurality of times before hologram extraction.

The at least one light propagation path may comprise the plurality of light propagation paths provided by the pupil expander. The structure of the pupil expander facilitates or enables a plurality of different possible light paths therethrough. The different possible light paths may be partially overlapping. In some embodiments, a series of different light paths are created by the pupil expander, wherein each light path in the series is a longer than the last. Each light path of the series exits the pupil expander at a different point on an exit surface thereof to create a corresponding series of light exit points or sub-areas. The series of light exits points or sub-areas may be substantially evenly spaced along the exit face of the pupil expander.

The pupil expander may be a waveguide pupil expander. Each light ray entering the pupil expander may be replicated a plurality of times. The pupil expander may be arranged to propagate light by a series of internal reflections and output light at a plurality of points along a primary face thereof. Each light propagation path may be defined by the number of internal reflections within the waveguide associated with that light propagation path. For example, a first light propagation path may comprise zero internal reflections and therefore corresponds to light that passes directly through the waveguide. For example, a second light propagation path may comprise two internal reflections before exiting the waveguide—namely, a first reflection at a first primary/reflective surface of the waveguide and a second reflection at a second primary/reflective surface of the waveguide, wherein the second primary/reflective surface is opposite or complementary to the first primary/reflective surface. For the avoidance of doubts, the light propagation paths therefore have some overlap. In other examples, a first light propagation path comprise one reflection and the second light propagation path comprises three reflections. The first light propagation path may be the shortest light propagation path and the nth light propagation path may be the longest light propagation path. The different propagation paths may pass through the entrance aperture of the viewing system at a different angle.

The at least one light propagation path may be only one of the plurality of light propagation paths provided by the pupil expander. The first to fourth stages may be carried out for each light propagation path of the plurality of light propagation paths in order to extract a hologram for each light propagation path. The first to fourth stages may be independently carried out for each light propagation path. The plurality of holograms corresponding to the plurality of light propagation paths may be combined in order to form the hologram for display on the display device.

Notably, the method accounts for the plurality of light propagation paths through the waveguide by performing the first to fourth steps (regardless of the starting point) for each light propagation path. The first to fourth steps may be carried out for each propagation path in turn. Alternatively, the first step may be carried out for each propagation path then the second step for each propagation path then the third and so on. It be appreciated that because of the partial overlap of the different propagation paths, the steps performed in relation to the nth propagation path may reuse calculations in relation to the n−1 propagation path, wherein the nth propagation path is next longest propagation path after the n−1 propagation path. The plurality of holograms respectively determined for the plurality of different light propagation path may be combined by addition—particularly if the holograms are phase or phase-only holograms.

The light propagated from the display plane in the first stage may comprise a zeroth complex light field having a phase component that is random, a quadratic function or a sampled quadratic function.

The amplitude component of the zeroth complex light field may be equal to that of the illuminating beam. In some embodiments, the amplitude of the zeroth complex light field is unity. If the method starts with the first stage, the phase component of the zeroth complex light field may be random. The random phase distribution is sometimes referred to as a random phase seed and may be used merely as a starting point for the method when it begins at the hologram plane (i.e., first stage).

The first to fourth stages may be iteratively repeated before the step of extracting the hologram from the final iteration. The light propagated from the display device for the second and subsequent iterations may comprise the phase distribution of the fourth complex light field of the immediately preceding iteration.

If further iterations of the first stage are performed before the method is stopped (i.e., the hologram is acceptable), the phase component from the fourth step is conserved or retained or carried forward. That is, the phase component of complex light field that propagated to the display plane in accordance with the first stage is equal to that of the fourth complex light field.

The hologram may be the phase component of the fourth data set. The hologram may be the phase component of the fourth data set of the final iteration or stage of the method. In some embodiments, the hologram is a kinoform or phase hologram or phase-only hologram. The amplitude component of the fourth complex light field may be discarded.

The hologram may be a hologram of a plurality of images. Each image may have a different image distance. The second stage of the method may be independently carried out for each image. Importantly, the method disclosed herein forms a hologram that can form image content on multiple planes at the same time. This is achieved by carrying out the second stage for each different plane and the combining the results—for example, by summing the complex light fields together. Each image may be a real image or a virtual image. Image content may be visible in front of the display device—i.e., downstream of the display device—and/or behind the display device—i.e., upstream of the display device.

Each complex light field is determined by wave propagation optics such as Fresnel propagation, shifted Fresnel propagation, fractional Fresnel propagation, fractional Fourier Transform or scaled Fast Fourier Transform.

Modification of the amplitude component of the second stage may comprise replacing the amplitude component of the second complex light field with that of the image or weighting the amplitude component of the second complex light field based on the amplitude component of the image.

Each step of cropping may comprise cropping the complex light field in accordance with at least one of the size and position of the corresponding pupil. At least one of the size and position of the entrance pupil may be determined by tracking or monitoring the viewing system or receiving information about the viewing system. In embodiments in which the viewing system is an eye, the method may comprise eye tracking or head tracking. The first to fourth stages disclosed herein may be repeated if at least one property of the entrance pupil—such as position or size—changes.

The, or each, image may be a virtual image. The, or each, image may appear to the viewing system to be behind or beyond the display device. That is, the image distance from the viewing system to the perceived image may be greater that the distance from the viewing system to the display device. However, in other embodiments, image content is additionally or alternatively formed downstream of the display device—that is, between the display device and viewing system/s.

The viewing system may be an eye of a viewer. The method may further comprise eye or head tracking the viewer in order to determine at least one of the size and position of the entrance pupil of the viewing system. In some embodiments, the size and/or position of the entrance pupil/s of the viewing system/s is used as part of the method to determine the hologram. In some embodiments, the method is performed in real-time—e.g. video rate—and the hologram is redetermined, such as recalculated, if the viewer moves or e.g. ambient light conditions change affecting the size of the entrance pupil of the viewer.

Propagation along each light propagation path provided by the pupil expander may comprise combining the individual complex light fields of the respective individual light propagation paths. The individual complex light fields may be combined by addition. Each light propagation path of a plurality of different light propagation paths provided by the pupil expander is considered individually. The complex light field formed by each light propagation path is individually determined.

The pupil expander may be a waveguide pupil expander. Each light propagation path corresponds to a different number of internal reflections within the waveguide. In some embodiments, the pupil expander is a waveguide pupil expander having a substantially one-dimensional (i.e., elongate) or two-dimensional shape (e.g. substantially planar such as slab-shaped). In embodiments, the exit pupil is expanded in a long direction or dimension of the component. The pupil expander may comprise a pair of opposing or complementary reflective surfaces. One of these surfaces may be only partially reflective to allow the light to escape at the series of light exit points or sub-areas.

Combining the individual complex light fields may comprise determining a lateral position of each individual complex light field on a plane containing the entrance pupil. The number of internal reflections within the waveguide determines the lateral position.

Combining the individual complex light fields may further comprise determining a total phase shift associated with the internal reflections of each light propagation path. This may comprise summing a plurality of phase shifts associated with each light propagation path, wherein each phase shift results from a reflection within the pupil expander.

There is also disclosed herein a hologram engine arranged to determine a hologram of an image for viewing using a head-up display. The head-up display comprises a display device and a pupil expander. The head-up display is configured to operate with at least one viewing system. Each viewing system comprises an entrance pupil on an entrance pupil plane, lens on a lens plane and a sensor on a sensor plane. The head-up display may be configured to operate with a pair of viewing systems such as a pair of eyes. The display device (e.g. spatial light modulator) is arranged to display the hologram. The pupil expander is arranged to receive light spatially modulated in accordance with the hologram. For example, the displayed hologram may be illuminated with at least partially coherent light from a source. The display device spatially modulates the received light in accordance with the displayed hologram. The hologram engine is arranged to determine a first complex light field at the entrance pupil of a viewing system. The first complex light field results from the propagation of light from a display plane of the display device along each light propagation path of the pupil expander. The first complex light field further results from cropping in accordance with the entrance pupil of the viewing system. The hologram engine is further arranged to determine a second complex light field at a sensor plane of a sensor of the viewing system. The second complex light field results from the propagation of light of the first complex light field from the input pupil through a lens of the viewing system. The second complex light field further results from modification of the amplitude component in accordance with the image. The hologram engine is yet further arranged to determine a third complex light field at the entrance pupil. The third complex light field results from the propagation of light of the second complex light field from the sensor plane back through the lens. The third complex light field further results from cropping in accordance with the entrance pupil. The hologram engine is further still arranged to determine a fourth complex light field at the display plane. The fourth complex light field results from the propagation of light of the third complex light field back along each light propagation of the pupil expander. The fourth complex light field further results from cropping in accordance with the display device. The hologram engine is arranged to extract the hologram from the fourth data set. The hologram engine may be embodied in a display driver such as a field programmable gate array, "FPGA", or application-specific integrated circuit, "ASIC". The display driver may be part of a picture generating unit, "PGU", for a head-up display, "HUD".

Aspects of the present disclosure relate to a hologram or kinoform characterised by the channeling or routing of holographic light. Specifically, there is disclosed herein a diffractive structure arranged to spatially modulate light transformable by a viewing system into an image, wherein the diffractive structure is configured to route light into a plurality of hologram channels, each hologram channel corresponding to a different part of the image.

The diffractive structure may be displayed on at display device such as a spatial light modulator, such as but not limited to a liquid crystal on silicon (LCOS) spatial light modulator (SLM). When the display device displaying the diffractive structure is suitably illuminated, the diffractive structure is configured to spatially modulate the light, as a result of which the light that is emitted by the display device is routed into the plurality of hologram channels. A single (I.e., a common) light source may be used to illuminate the entire diffractive structure. The diffractive structure may comprise a plurality of pixels wherein every pixel of the diffractive structure contributes light to each of the hologram channels.

The hologram channels may instead be referred to as "holographic channels" since they comprise channels of light that has been spatially modulated by the diffractive structure.

The diffractive structure may be arranged such that the hologram channels propagate from the diffractive structure at different angles. That is, each hologram channel is characterised by a unique axis angle, or pair of angles, with respect to the display device as described above. Each such angle may be defined between a primary, or core, direction of travel of the respective channel and a point on the display device, such as a central point on the display device, on which the diffractive structure is displayed. Each pixel of the hologram or diffractive structure may contribute to every channel.

Each hologram channel may principally comprise spatially modulated light in accordance with a respective different part of the image. The word "principally" is used to reflect that some overlap between channels may occur but the overlap is relatively small. For example, a first channel may principally (i.e. generally or substantially) correspond to a first angular portion of the field of view (i.e. image) and a second channel may generally or substantially correspond to a second angular portion of the field of view (i.e. image) but there may be some partial overlap between the first and second angular portions. That is, the first channel and second channel may both encode information of an overlapping area of the field of view.

Each channel corresponds to a sub-area of the image (that is, an angular region of the field of view). Whilst there may be some partial overlap between the sub-areas (as described above), each channel is uniquely associated with a point in the field of view that forms the centre of the corresponding sub-area. In some embodiments, the sub-areas are the same size and/or shape. In other embodiments, the sub-areas have different sizes and/or shapes. In some embodiments, the shape of each sub-area is determined by the shape of the display device—more specifically, the shape of the area delimiting the array of pixels.

The diffractive structure may be arranged to spatially modulate the phase of light.

The diffractive structure may be arranged to route light through a waveguide. The waveguide may be arranged for pupil expansion, or pupil replication.

The cross-sectional shape of the light pattern formable by each hologram channel may substantially corresponds to the shape of an entrance aperture of the viewing system. The size of the cross-section of each channel may also substantially correspond to the size of the entrance aperture, when the cross-section is viewed at the plane of the entrance aperture. The cross-section may be sized to be of a similar but larger size than the size of the entrance aperture, when the cross-section is viewed at the plane of the entrance aperture.

The hologram channels may be spatially separated or at least partially spatially separated. The channels may fan out, or diverge, in order to spatially separate from one another, as they propagate away from the diffractive structure, towards a viewer or viewing system. In some embodiments, the channels fan-out in only one direction/dimension—e.g. the horizontal direction.

There is further disclosed herein a system comprising the diffractive structure, a waveguide arranged to receive the spatially modulated light from the diffractive structure and a viewing system arranged to receive the spatially modulated light via the waveguide.

The system may be arranged such that light of each hologram channel follows a different optical path from the diffractive structure to the viewing system.

The different optical paths may comprise a different number of reflections within the waveguide. The different optical paths may have different lengths. The different optical paths may pass through the entrance aperture of the viewing system at different respective angles.

The waveguide may be arranged so that all hologram channels are routed through the entrance aperture of the viewing system at any viewing position on a viewing plane. The waveguide may only route each hologram channel via one optical path to the viewing system for each permitted viewing position.

At least two hologram channels of the plurality of hologram channels may be partially overlapping at the entrance aperture of the viewing system.

The diffractive structure may be a kinoform or hologram. It may comprise a computer-generated hologram. A hologram engine or other controller or processor may be provided for outputting signals to control a display device to display the diffractive structure.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction may be a real image and spatially separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the original object (i.e., target image for reconstruction). Such a holographic recording may be referred to as a phase-only hologram. Embodiments relate to a phase-only hologram, but the present disclosure is equally applicable to amplitude-only holography. The present disclosure is not limited to any particular method of hologram calculation. Some embodiments relate to point cloud holograms—that is, holograms built up using point cloud methods—by way of example only. However, the present disclosure is equally applicable to Fourier or Fresnel-type holograms and holograms calculated according to other techniques such as coherent ray tracing.

The present disclosure is also equally applicable to forming a holographic reconstruction using amplitude and phase information related to the original object (i.e., target image). In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator.

Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

The following numbered items are also disclosed:

1. A light engine arranged to provide a viewing system, having an entrance pupil, with spatially modulated light, wherein the display system comprises:
   a display device arranged to display a hologram and spatially modulate light in accordance with the hologram; and
   a hologram engine arranged to receive contribution information identifying contributory and non-contributory areas of the display device based on the location of the entrance pupil, wherein the contributory areas of the display device substantially propagate spatially modulated light passing through the entrance pupil at the location and non-contributory areas of the display device substantially propagate spatially modulated light stopped by the entrance pupil at the location,
   wherein the contribution information further identifies (i) at least one primary contributory area of the display device propagating light to the viewing system that contributes to a primary image and (ii) at least one secondary contributory area of the display device propagating light to the viewing system that contributes to a secondary image, wherein
   the hologram engine is further arranged to determine a hologram based on the at least one primary contributory area of the display device and to output the hologram to the display device for display.
2. A light engine as in item 1, wherein the light engine further comprises a monitoring system arranged to determine the location of the entrance pupil of the viewing system.
3. A light engine as in item 1 or item 2, wherein the light engine further comprises a waveguide arranged to receive the spatially modulated light from the display device and provide a plurality of different light propagation paths for the spatially modulated light from the display device to the entrance pupil, wherein each contributory area corresponds to a different respective light propagation path provided by the waveguide.
4. A light engine as in any of items 1 to 3 wherein the viewing system is arranged to form an image corresponding to the hologram.
5. A light engine as in item 4 wherein the primary image comprises a first version of the image and the secondary image comprises a second version of the image.
6. A light engine as in any preceding item wherein the contribution information identifies respective contributory and non-contributory areas of the display device for each of a plurality of image points of the image.
7. A light engine as in item 6 wherein the hologram comprises a plurality of sub-holograms, wherein each sub-hologram is determined by the hologram engine based on the contribution information of a respective image point of the image.
8. A method of determining a hologram for display on a display device; the method comprising:
   (i) determining the location of the entrance pupil of a viewing system arranged to view the hologram;
   (ii) identifying contributory areas and non-contributory areas of the display device, wherein the contributory areas of the display device substantially propagate light passing through the entrance pupil of the viewing system at the determined location and non-contributory areas of the display device substantially propagate light stopped by the entrance pupil of the viewing system at the determined location; and
   (iii) identifying at least one primary contributory area of the display device that provides light contributing to a primary image and at least one secondary contributory area of the display device that provides light contributing to a secondary image; and
   (iv) determining the hologram based on the at least one primary contributory area of the display device.
9. A method of determining a hologram as in item 8 wherein steps (ii) to (iv) are carried out for each image point of a plurality of image points of the image, and wherein determining a location of each contributory area for each image point comprises identifying a location at which a light ray, travelling from said image point to the entrance pupil, intersects the display device.
10. A method of determining a hologram as in item 8 or 9 wherein the viewing system comprises a waveguide arranged to receive spatially modulated light from the display device and provide a plurality of different light propagation paths for the spatially modulated light from the display device to the entrance pupil, and wherein the step (iii) comprises, for each image point, determining a number of internal reflections, B, within the waveguide pupil expander corresponding to the primary image.
11. A method as in item 10 wherein the step of determining the number of internal reflections (B) is based on an angle associated with the corresponding image point, wherein the angle is the angle to the optical axis of a line formed by extrapolating to the image a line connecting the centre of the display device and the determined entrance pupil location.
12. A method as in item 11 wherein each contributory area has a size based on a diameter of the entrance pupil.
13. A method as in any of item 8 to 12 wherein steps (ii) and (iii) comprise for each image point:
   ray tracing from the image point [$x_{virtual}$, $y_{virtual}$, $z_{virtual}$] to a viewing plane of the viewing system for B light reflections within the waveguide to identify a position [$x_{sensor}$, $y_{sensor}$] on the viewing plane;
   determining coordinates, [$x_{LCOS}(B)$, $y_{LCOS}(B)$], of the chief light ray at the display device for light propagation with B reflections from the image point [$x_{virtual}$, $y_{virtual}$, $z_{virtual}$] to the position [$x_{sensor}$, $y_{sensor}$] on the viewing plane; and
   identifying active pixels of the display device within an area defined by [$x_{LCOS}(B)$, $y_{LCOS}(B)$].
14. A method as in any of items 8 to 13 wherein step (iv) comprises determining one or more values for the hologram only in the at least one primary contributory area of the display device.
15. A method as in any of items 8 to 13 further comprising excluding values for the hologram in an area of the display device that is not comprised within the primary contributory area.
16. A method of determining a hologram as in any of items 8 to 13 wherein step (iv) comprises excluding hologram values associated with at least one secondary contributory area, during determination of the hologram.
17. A method of determining a hologram as in any of items 8 to 13 wherein step (iv) comprises limiting the hologram determination solely to the at least one primary contributory area of the display device.

18. A method of determining a hologram as in any of items 8 to 17 wherein step (iv) comprises determining a sub-hologram within the respective at least one primary contributory area for each image point and combining the sub-holograms in order to form the hologram.

19. A method of determining a hologram as in item 18 wherein each sub-hologram comprises an amplitude and/or phase hologram component determined by propagating a light wave from $[x_{virtual}, y_{virtual}, z_{virtual}]$ to the corresponding primary contributory area.

20. A method of determining a hologram as in any of items 8 to 13 further comprising, for each image point, identifying an additional contributory area of the display device associated with B+ΔB bounces.

21. A method of determining a hologram as in item 20 wherein identifying an additional contributory area comprises:
 - ray tracing back from $[x_{sensor}, y_{sensor}]$ to virtual image plane $z_{virtual}$ for B+ΔB bounces;
 - determining virtual point coordinates, $[x_{virtual}(\Delta B), y_{virtual}(\Delta B), z_{virtual}]$, that will image to $[x_{sensor}, y_{sensor}]$ for B+ΔB reflections;
 - determining the coordinates, $[x_{LCOS}(B+\Delta B), y_{LCOS}(B+\Delta B)]$, of a chief ray at the display device for light propagation from $[x_{virtual}(\Delta B), y_{virtual}(\Delta B), z_{virtual}]$ to the viewing plane with B+ΔB bounces; and
 - identifying additional active pixels of the display device within a second area defined by $[x_{LCOS}(B+\Delta B), y_{LCOS}(B+\Delta B)]$.

22. A method of determining a hologram as in item 21 further comprising determining an additional sub-hologram for each additional active pixel and combining the additional sub-holograms with the sub-holograms.

23. A method of determining a hologram as in item 22 wherein each additional sub-hologram comprises an amplitude and/or phase hologram component determined by propagating a light wave from $[x_{virtual}(\Delta B), y_{virtual}(\Delta B), z_{virtual}]$ to the additional contributory area.

24. A light engine or a method of determining a hologram as in any preceding item wherein the hologram is configured such that the primary image and at least one secondary image are virtual images each having a non-infinite virtual image distance.

25. A light engine or a method of determining a hologram as in preceding item wherein a display area of the display device has a first dimension less than 5 cms such as less than 2 cms or less than 1 cm.

26. A light engine or a method of determining a hologram as in preceding item wherein a distance from the display device to the entrance pupil of the viewing system is equal to or greater than 20 cms or 50 cms such as greater than 75 cms or greater than 100 cms.

27. A light engine or a method of determining a hologram as in any preceding item wherein a waveguide is arranged to receive spatially modulated light from the display device and wherein the primary image is a selected image, from a plurality of images formed by the waveguide, having the greatest luminance.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
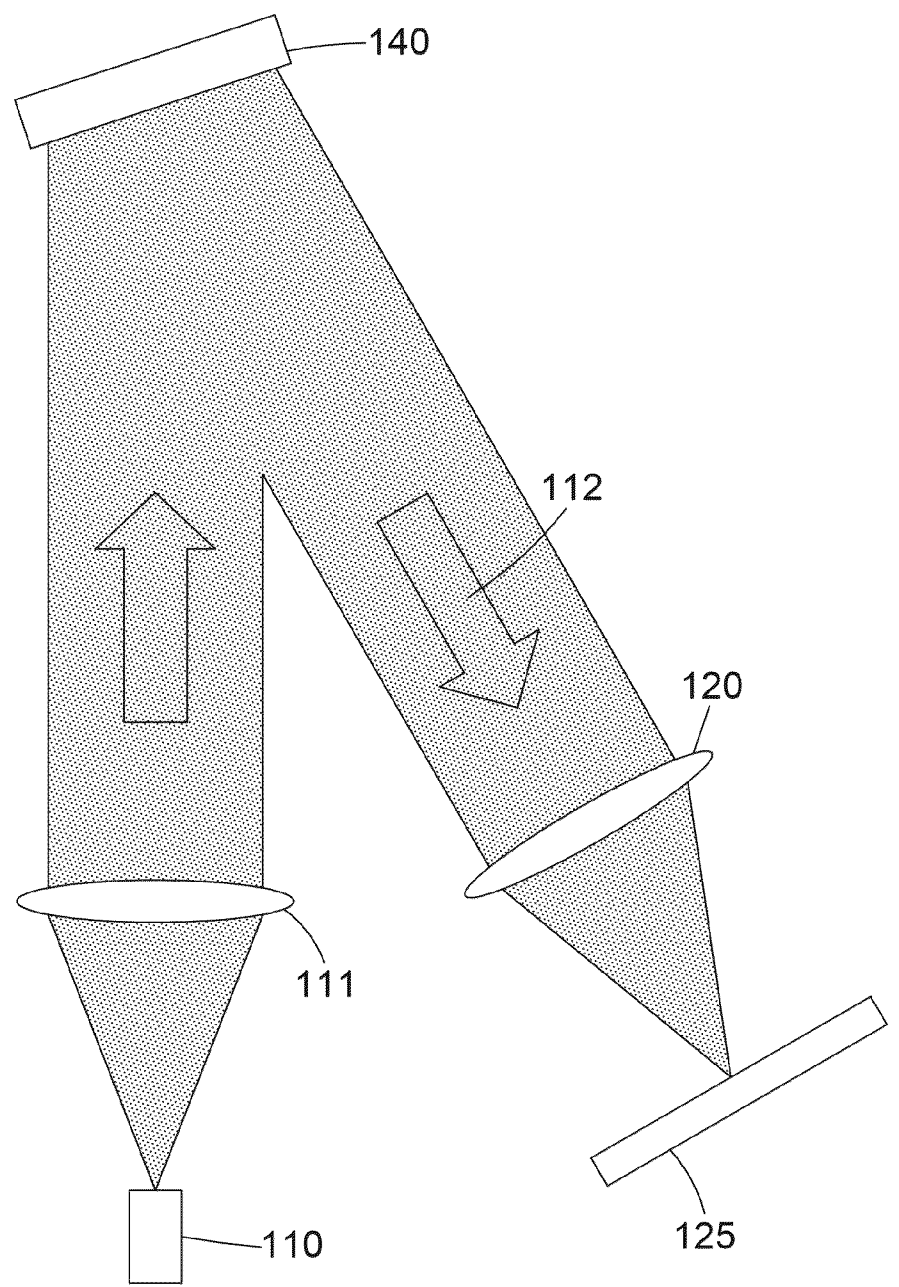
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It will be appreciated that this is merely an example, and that other methods for computer-generating the hologram are contemplated in the present disclosure. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Gerchberg-Saxton Method

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e., a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi$ [u, v] of the Fourier transform of the data set which gives rise to a known amplitude information T[x, y], wherein the amplitude information T[x, y] is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information ψ[u, v] is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
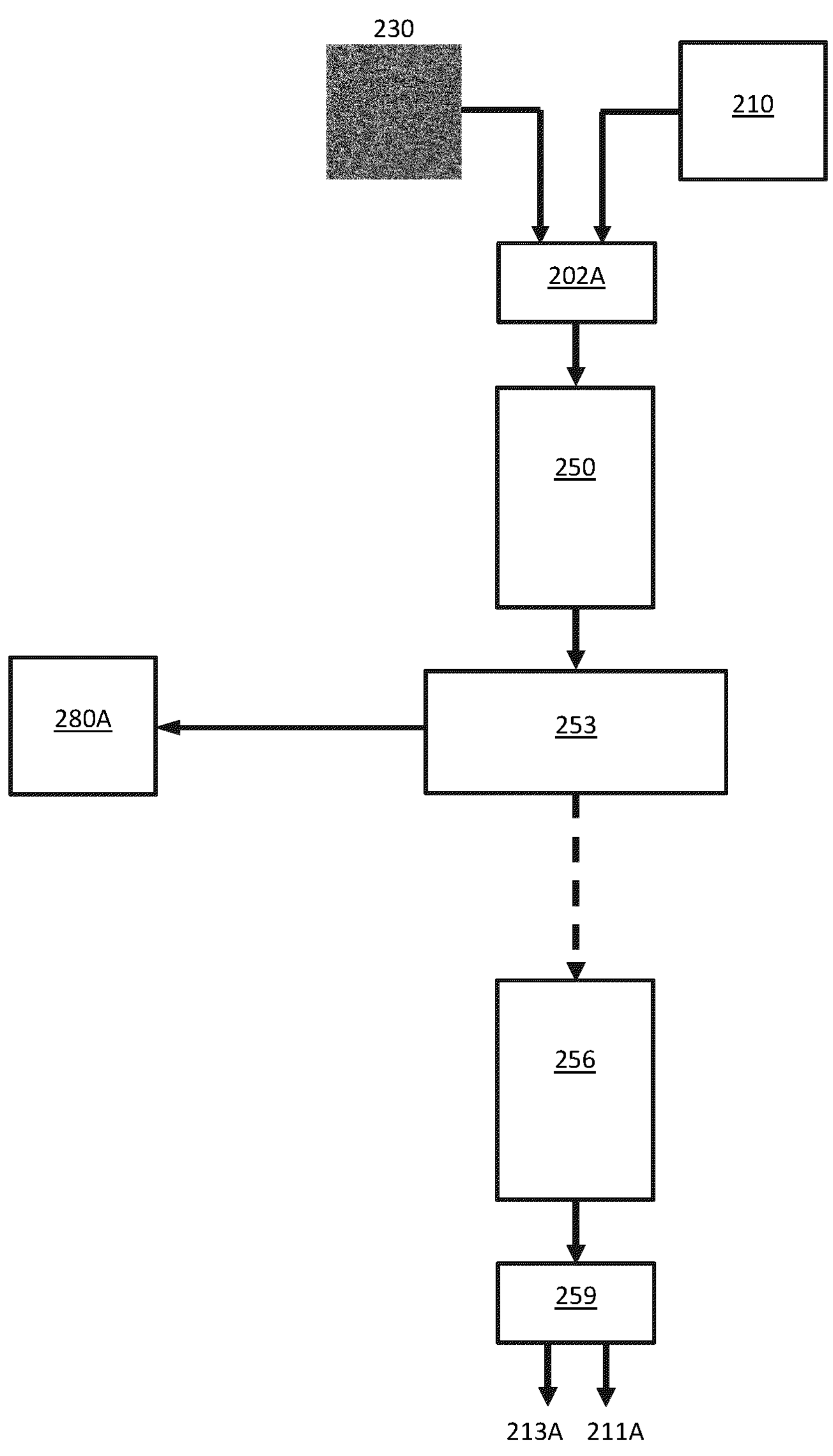
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantiles each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e., not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
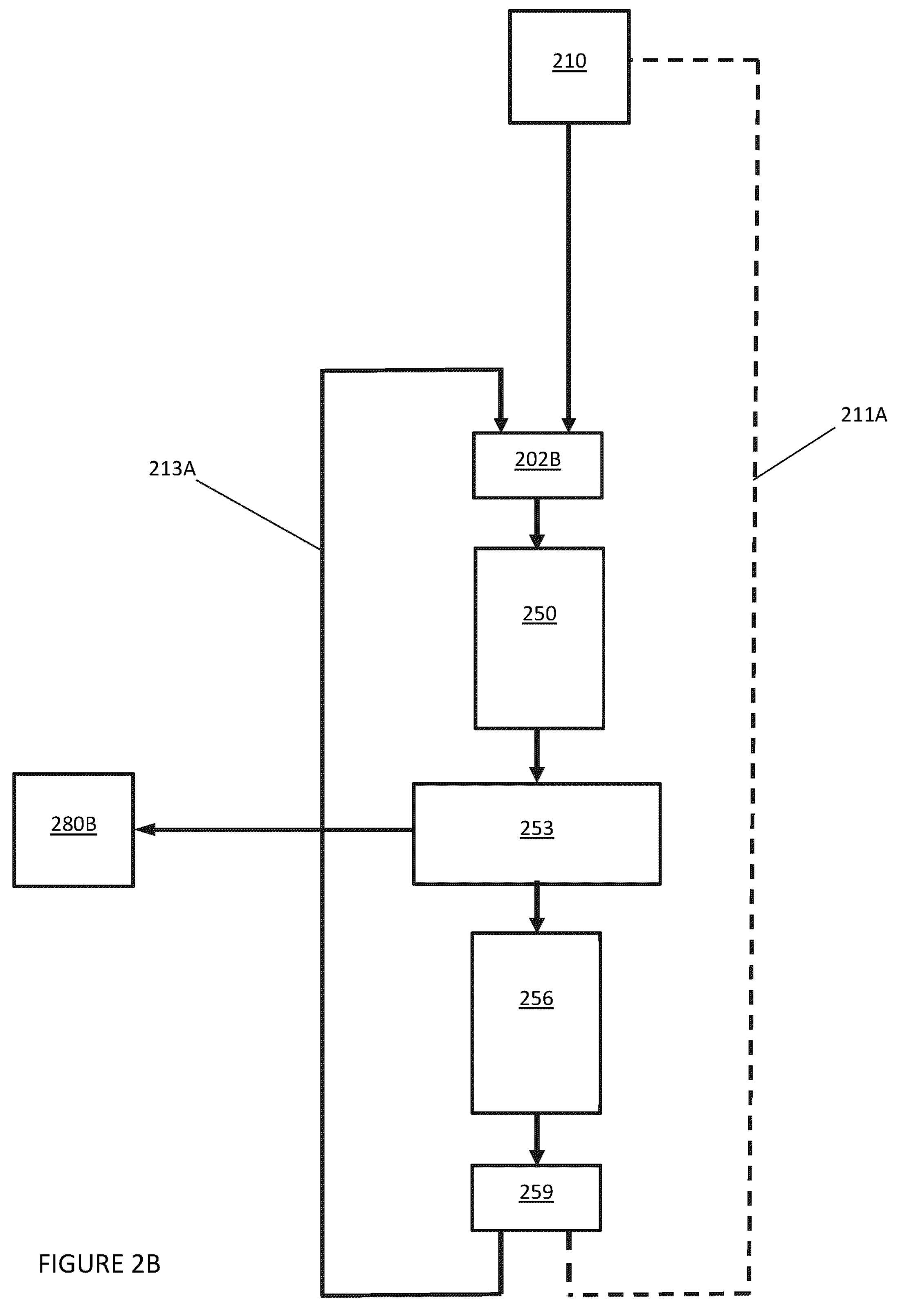
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
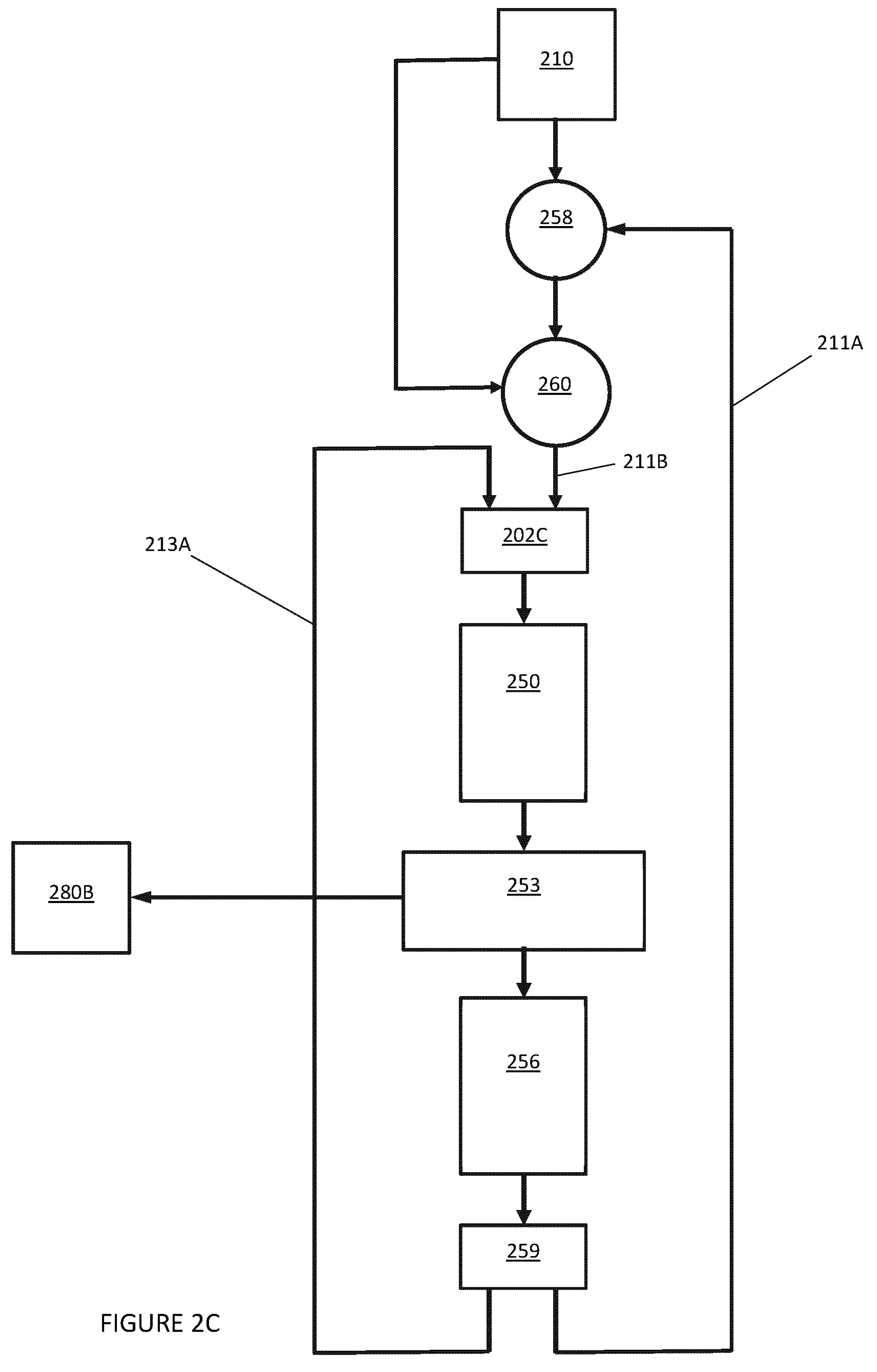
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta\cdot\exp(i\angle R_n[x,y])\}$$

$$\eta=T[x,y]-\alpha(|R_n[x,y]|-T[x,y])$$

where:

F' is the inverse Fourier transform;

F is the forward Fourier transform;

R[x, y] is the complex data set output by the third processing block 256;

T[x, y] is the input or target image;

∠ is the phase component;

ψ is the phase-only hologram 280B;

η is the new distribution of magnitude values 211B; and

α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods. As will be seen, subsequent Figures herein are described as comprising a point cloud method for hologram calculation. However other methods of hologram calculation, including the Fourier method described above in relation to FIGS. 2A to 2C, may instead be used.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e., the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
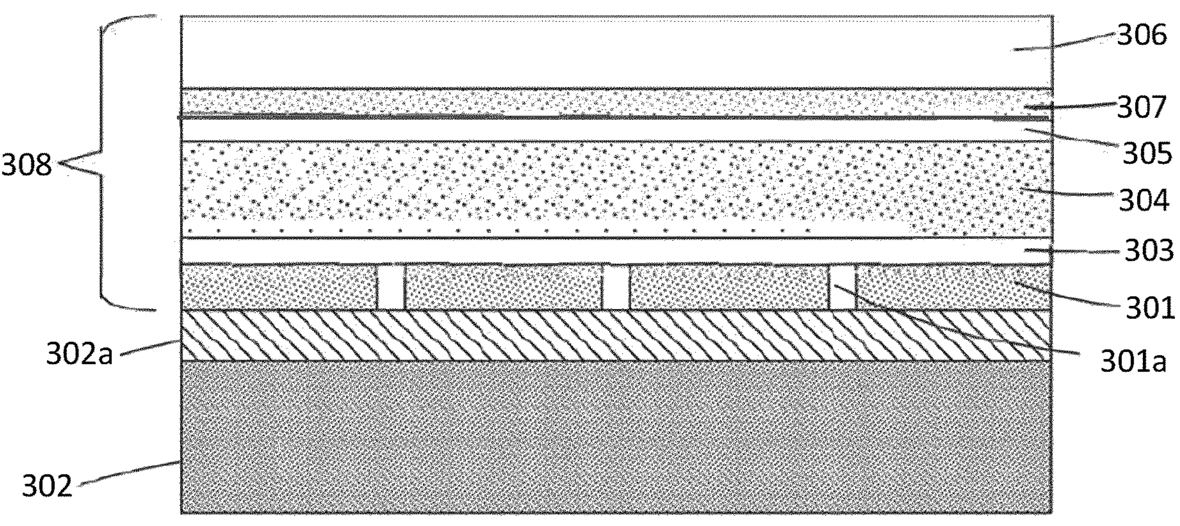
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301*a*, arranged on the upper surface of the substrate. Each of the electrodes 301 can be addressed via circuitry 302*a* buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301*a*. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e., no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Image Projection Using a Small Display Device and a Long Viewing Distance

The present disclosure relates to image projection wherein the separation between the display device and viewer is much greater than the size of the display device. The viewing distance (i.e., distance between the viewer and display device) may be at least an order of magnitude greater than the size of the display device. The viewing distance may be at least two orders of magnitude greater than the size of the display device. For example, the pixel area of the display device may be 10 mm×10 mm and the viewing distance may be 1 m. The image projected by the system is formed on a display plane that is spatially separated from the display device. The entrance aperture via which the viewer sees the image may also be relatively small, compared to the viewing distance.

In accordance with the present disclosure, the image is formed by holographic projection. A hologram is displayed on the display device. The hologram is illuminated by a light source (not shown) and an image is perceived on a display plane that is spatially separated from the hologram. The image may be real or virtual. For the purpose of the explanation that follows, it is helpful to consider a virtual image formed upstream of the display device. That is, appearing behind the display device. However, it is not essential that the image is a virtual image and the present disclosure is equally applicable to a real image formed between the display device and viewing system.

The present disclosure enables a very small display device to be used, in order to represent images (real or virtual), even when the viewing distance is relatively large. It does so by providing a hologram that mimics the presence of the image at a desired location and by directing light that has been spatially modulated by that hologram in an intelligent manner, taking into account the location of the viewing system and the size and/or shape of the entrance aperture via which light enters the viewing system.

The display device comprises pixels that display the hologram. The pixel structure of the display device is diffractive. The size of the holographic image is therefore governed by the rules of diffraction. A consequence of the very small size of the display device is explained below, in broad optical terms, with reference to FIG. 4.

Figure 4:
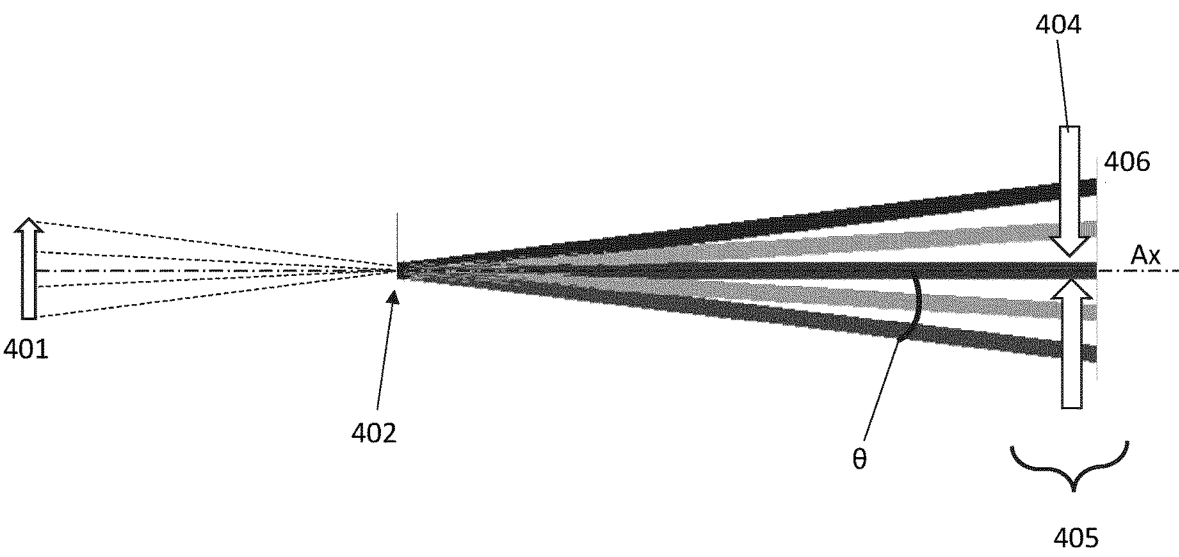
FIG. 4 shows angular content of an image effectively propagating via a small viewing window towards an aperture.

FIG. 4 shows an aperture 402, which forms a small viewing window between a real object or image 401 and a viewing system 405. Aperture 402 is representative of the aperture of a display device. FIG. 4 illustrates the effect of the aperture 402 on light coming from the real object or real image 401, which is located at a finite distance upstream of the aperture 402. The aperture 402 is very small, relative to the distance between it and a viewing system 405. In this illustrative arrangement, the image 401, display device 402 and viewing system 405 are arranged on an optical axis, Ax.

FIG. 4 shows only those light rays (or, ray bundles) from the image 401 that will pass through the very small viewing window defined by the aperture 402, and travel towards a viewing plane 406, which is defined perpendicular to the optical axis Ax. The skilled reader will appreciate that other light rays will travel from the image 401 but will not coincide with the aperture 402, such that they cannot (in this example) reach the viewing plane 406. Moreover, five light rays (or ray bundles) are shown as travelling from the image 401—one from each of five different parts of the image 401—but, again, the skilled reader will realise that this is illustrative only and the present disclosure is not limited to five rays or ray bundles. The viewing system 405 has an entrance aperture 404, just forward of the viewing plane 406. The viewing system 406 may be a human eye. The entrance aperture 404 may therefore be the pupil of the eye and the viewing plane 406 may be the retina of the eye.

FIG. 4 illustrates how the very small size of the aperture 402 means that only part of the image can be viewed from each position on a viewing plane. FIG. 4 shows the five example ray bundles each characterized by a respective angle to the optical axis, Ax, and each travelling from a different respective part of the image 401. The light bundle travelling along the optical axis, Ax, carries the centre part of the image—that is, it is the light of the centre of the image. The other light bundles carry the other parts of the image. A consequence of the very small viewing window defined by the aperture 402, and the very small entrance aperture of the pupil 404, as compared to the large viewing distances, is that not all image content can pass through the entrance pupil 404 at any given viewing position. In other words, not all image content is received by the eye. In the example of FIG. 4, only one of the five light bundles illustrated passes through the pupil 404 at any viewing position.

In this example, for the pupil 404 position shown, the centre part of the image is seen by the eye. The rest of the image information is blocked. The reader will understand that if the viewer moves up or down, a different light bundle may be received by the eye and, for example, the centre part of the image may be blocked. The viewer therefore only sees a portion of the full image. The rest of the image information is blocked. The view of the viewer is, in other words, heavily restricted because they are effectively looking at the image through the small aperture of the display device itself.

In summary, light propagates over a range of angles from the display device to the small viewing window. At a 1 m viewing distance, only a small range of angles from the small viewing window can propagate through the eye's pupil to form image at the retina for a given eye position. The only parts of the image that are visible are the ones falling within the small angular range shown in FIG. 4 that passes through the entrance aperture 404. Accordingly, the field of view is very small, and the specific angular range depends heavily on the eye position.

The problem of the small field of view and sensitivity to eye position explained with reference to FIG. 4 is a consequence of the large viewing distance and small aperture of the viewing window, as well as the small entrance aperture of the viewing system. The importance of viewing distance is explained further with reference to FIGS. 5 to 7.

It is well known to use holograms, displayed and illuminated on a suitable display device, to form images (real or virtual) at a desired location. However, the present inventors have identified that conventional holographic techniques are not adequate for forming an image clearly and accurately using a small display device, particularly for a relatively large viewing distance or for relatively small viewing apertures. They have further recognised that this is particularly the case if an image, such as a virtual image, is to be represented at a non-infinite distance away from the viewer. Moreover, the present inventors have recognised that conventional holographic techniques typically rely on the formation of a holographic reconstruction of the image between the display device and the viewer, where in that holographic reconstruction may be formed in free space or a light receiving member. However, reliance on the formation of an interim holographic reconstruction generally requires additional optical elements such as diffusers, lenses or mirrors, which may be impractical or otherwise undesirable particularly in applications where compactness is desired and real estate value is high.

Figure 5A:
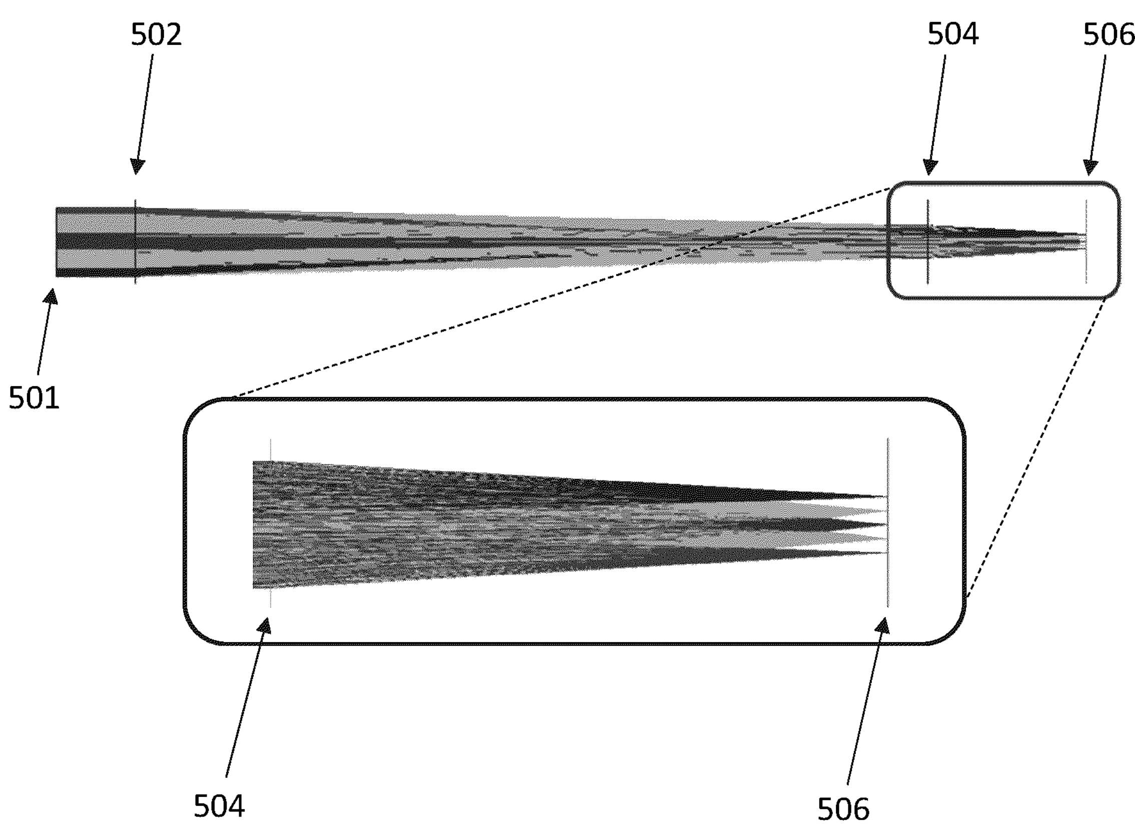
FIG. 5*a* shows a viewing system with a relatively small propagation distance.

FIG. 5A shows a display device 502 arranged to display a hologram and propagate light that has been spatially modulated in accordance with the hologram to a viewing system comprising an entrance aperture 504 and viewing plane 506. The display device in FIG. 5A is of a similar small physical size to the viewing aperture in FIG. 4. FIG. 5A also shows, upstream of the display device 502, a ray trace of light from a virtual image (not shown) that the hologram represents. The virtual image 501 is at infinity, and so the rays traced between the virtual image and display device 502 are collimated. The collimated light from the virtual image is depicted as comprising five light rays or light ray bundles, however it will be appreciated that this is illustrative only and should not be regarded as limiting on the present disclosure.

The lower part of FIG. 5A shows a magnified view of the viewing system. This figure is schematic and therefore physiological detail of the eye is not shown. In practice, there is, of course, a light source (not shown in FIG. 5A) arranged to illuminate the display device 502.

In FIG. 5A, the distance between the display device and viewing plane is small enough that the full diffraction angle of light rays from the display device can form the image on the retina. In other words, light propagation paths of all five light ray bundles (shown as coming from the virtual image) pass through the entrance aperture. Accordingly, all points on the virtual image map onto the retina and all image content is delivered to the viewing plane. The field of view of the perceived image is therefore a maximum. At the optimum position, the field of view is equal to the diffraction angle of the display device. Interestingly, different image points on the retina are formed from light propagating from different regions on the display device 502—e.g., the image point closest to the top of FIG. 5A is formed from light propagating from the lower portion of the display device only. Light propagating from other regions of the display device does not contribute to this image point.

Figure 5B:
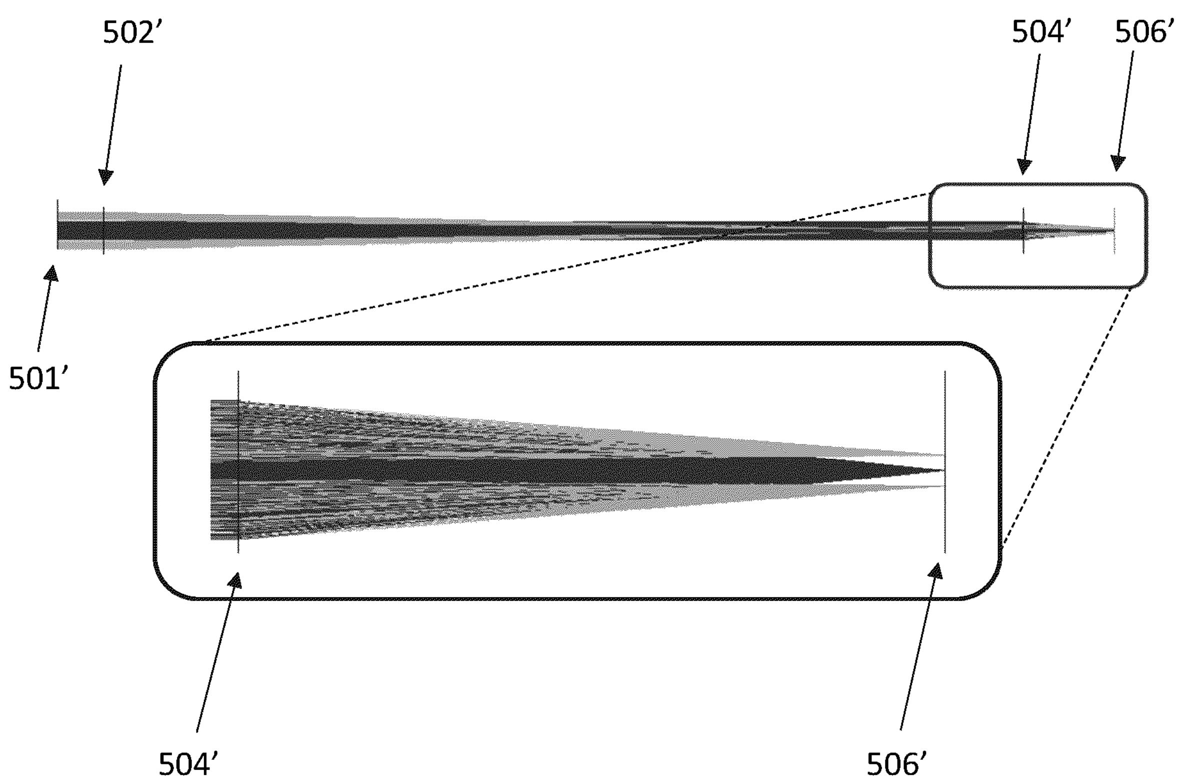
FIG. 5*b* shows a viewing system with a relatively large propagation distance.

FIG. 5B shows the situation that arises as the viewing distance is increased.

In more detail, FIG. 5B shows a display device 502' arranged to display a hologram and propagate light modulated in accordance with the hologram to a viewing system comprising an entrance aperture 504' and viewing plane 506'. The virtual image 501' is at infinity and so the rays traced between the virtual image and display device are collimated. The lower part of FIG. 5B shows a magnified view of the viewing system. This figure is schematic and therefore physiological detail of the eye is not shown. In practice, there is, of course, a light source (not shown in FIG. 5B) arranged to illuminate the display device 502'.

FIG. 5B only shows those rays of light that can propagate through the aperture 504'; any other rays, which cannot pass through the aperture 504', are omitted. However, it will be understood that those other rays would also propagate from the display device 502'. At the larger viewing distance of FIG. 5B, the light cone has spread out, on the viewing plane, to such an extent that some of the ray bundles are blocked by (i.e., they do not physically coincide with) the entrance aperture 504'. Specifically in this example, ray bundles associated with edge parts of the virtual image are blocked by the entrance pupil 504'. However, if the entrance aperture 504' moved position, parallel to the viewing plane 506', different respective ray bundles may coincide with the aperture 504', such that different respective parts of the virtual image would be seen. Accordingly, for any given aperture position, the entire virtual image is not visible and the part of the virtual image that is visible is heavily dependent on aperture (e.g., eye) position. Thus, large distances between the display device and viewing system are problematic owing to the small size of the display device, particularly when combined with a relatively small entrance aperture.

Figure 6A:
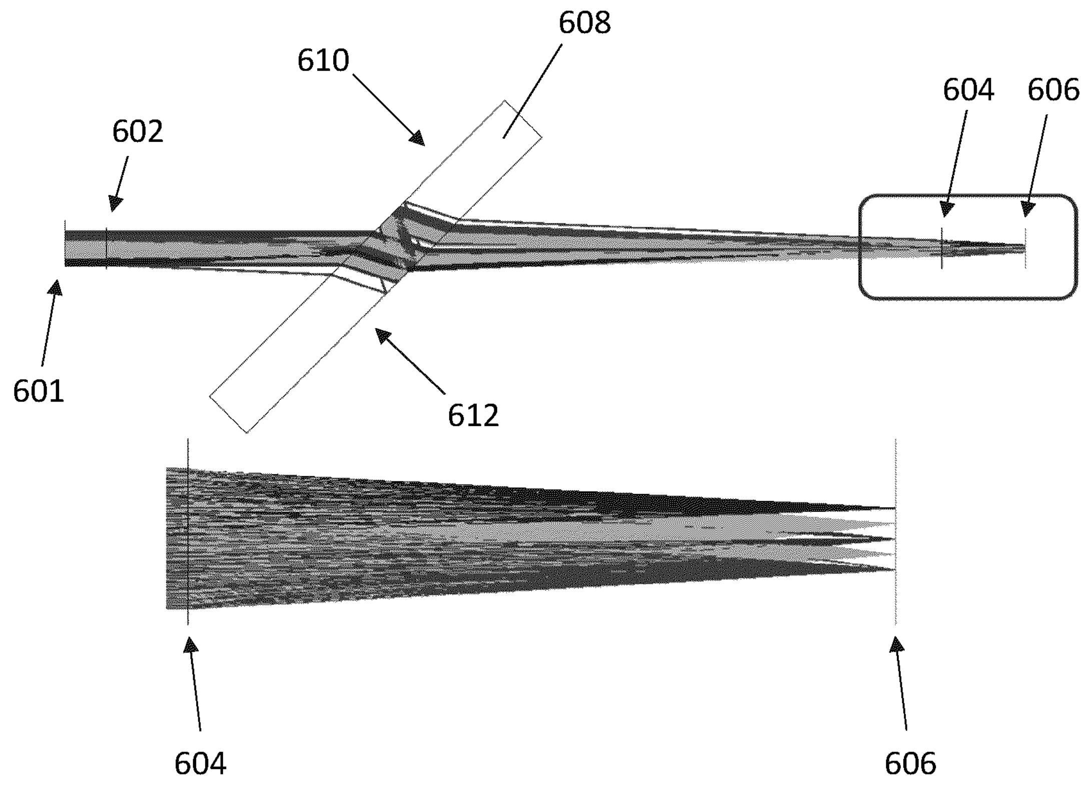
FIG. 6*a* shows a viewing system with a relatively large propagation distance, which includes a waveguide, for forming a virtual image at infinity.

FIG. 6A shows an improved system comprising a display device 602, propagating light that has been encoded with a hologram displayed on the display device 602, towards a viewing system that comprises an entrance aperture 604 and a viewing plane 606. In practice, there is, of course, a light source (not shown) arranged to illuminate the display device 602. The improved system further comprises a waveguide 608 positioned between the display device 602 and the entrance aperture 604. The lower part of FIG. 6A shows a magnified view of the entrance pupil 604 and the viewing plane 604. This figure is schematic and therefore physiological detail of the eye is not shown.

The viewing distance of FIG. 6 is the same as that of FIG. 5B. However, the ray bundles that were blocked in FIG. 5B are effectively recovered by the waveguide 608 such that the full image information is received by the viewing system—despite the longer viewing distance.

The presence of the waveguide 608 enables all angular content from the display device 602 to be received by the eye, even at this relatively large projection distance. This is because the waveguide 608 acts as a pupil expander, in a manner that is well known and so is described only briefly herein.

In brief, the waveguide 608 comprises a substantially elongate formation. In this example, it comprises an optical slab of refractive material, but other types of waveguide are also well known and may be used. The waveguide 608 is located so as to intersect the light cone that is projected from the display device 602, for example at an oblique angle. The size, location, and position of the waveguide 608 are configured to ensure that light from each of the five ray bundles, within the light cone, enters the waveguide 608. Light from the light cone enters the waveguide 608 via its first planar surface 610 (located nearest the display device 602) and is guided at least partially along the length of the waveguide 608, before being emitted via its second planar surface 612, substantially opposite the first surface 610 (located nearest the eye). As will be well understood, the second planar surface 612 is partially reflective, partially transmissive. In other words, when each ray of light travels, within the waveguide 608, from the first planar surface 610 to the second planar surface 612 of the waveguide 608, some of the light will be transmitted out of the waveguide 608 and some will be reflected by the second planar surface 612, back towards the first planar surface 610. The first planar surface 610 is reflective, such that all light that hits it, from within the waveguide 608, will be reflected back towards the second planar surface 612. Therefore, some of the light may simply be refracted between the two planar surfaces 610, 612 of the waveguide 608 before being transmitted, whilst other light may be reflected, and thus may undergo one or more reflections, (or 'bounces') between the planar surfaces 610, 612 of the waveguide 608, before being transmitted. A net effect of the waveguide 608 is therefore that the transmission of the light is effectively expanded across multiple locations on the second planar surface 612 of the waveguide 608. All angular content output by the display device 602 may thus be present, at a greater number of positions on the display plane (and at a greater number of positions on the aperture plane) than would have been the case, in the absence of the waveguide 608. This means that light from each ray bundle may enter the entrance aperture 604 and contribute to an image formed by the viewing plane 606, despite the relatively large projection distance. In other words, all angular content from the display device 602 can be received by the eye. Therefore, the full diffraction angle of the display device 602 is utilised and the viewing window is maximised for the user. In turn, this means that all the light rays contribute to the perceived virtual image 601.

Figure 6B:
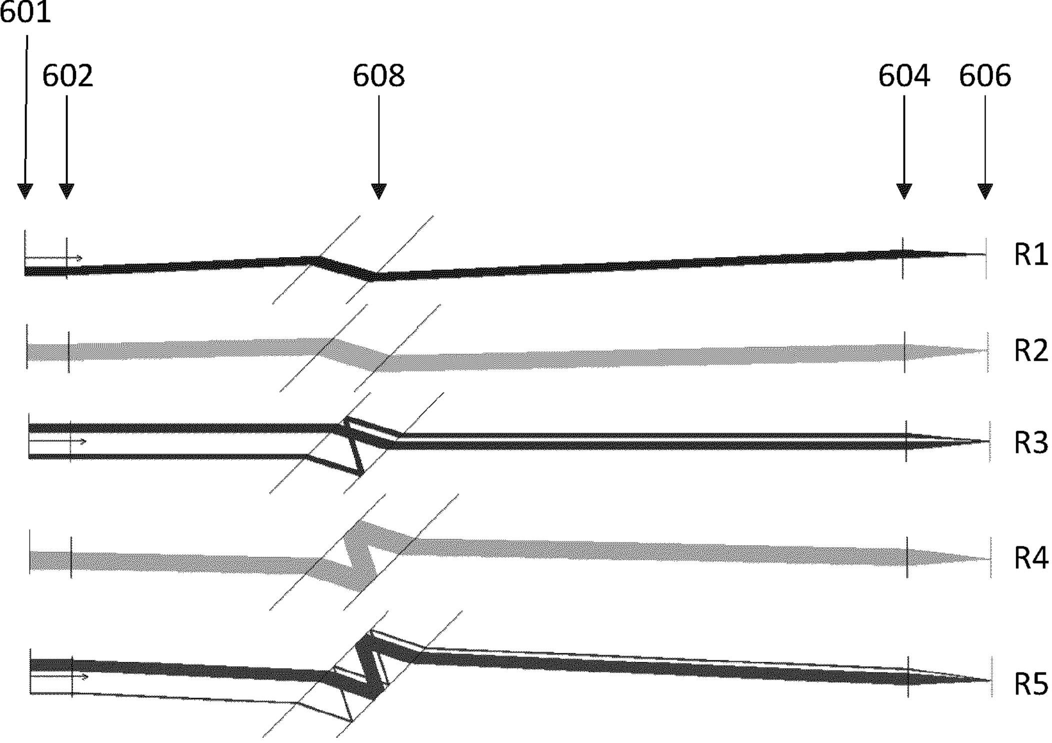
FIG. 6*b* shows a magnified view of the optical paths of FIG. 6*a;*

FIG. 6B shows the individual optical paths for each of the five ray bundles that contribute to five respective image points within the virtual image 601 that is formed in FIG. 6A—labelled from top to bottom as R1 to R5, respectively. As can be seen therein, the light of each of R1 and R2 is simply refracted and then transmitted by the waveguide 608. The light of R4, on the other hand, encounters a single bounce before being transmitted. The light of R3 comprises some light from a corresponding first part of the display device 602 that is simply refracted by the waveguide 608 before being transmitted, and some light from a second, different corresponding part of the display device 602 that encounters a single bounce before being transmitted. Similarly, the light of R5 comprises some light from a corresponding first part of the display device 602 that encounters a single bounce before being transmitted and some light from a second, different corresponding part of the display device 602 that encounters two bounces before being transmitted. For each of R3 and R5, two different parts of the LCOS propagate light corresponding to that part of the virtual image.

The present inventors have recognised that, at least in some applications, it is preferable for the virtual image distance—i.e., for the distance from the viewer to the virtual image—to be finite, as opposed to the virtual image being formed at infinity. In certain applications, there will be a preferred virtual image distance, at which it is desirable or necessary for the virtual image content to appear. For example, this can be the case in a head-up display, for example in an automotive setting, for example if virtual image content is to be superimposed onto real content that is being viewed by the viewer through a vehicle windscreen. For example, a desired virtual image distance may comprise the virtual image content being formed a few metres, for example 3 metres or 5 metres, in front of the viewer's vehicle or windscreen.

Figure 7:
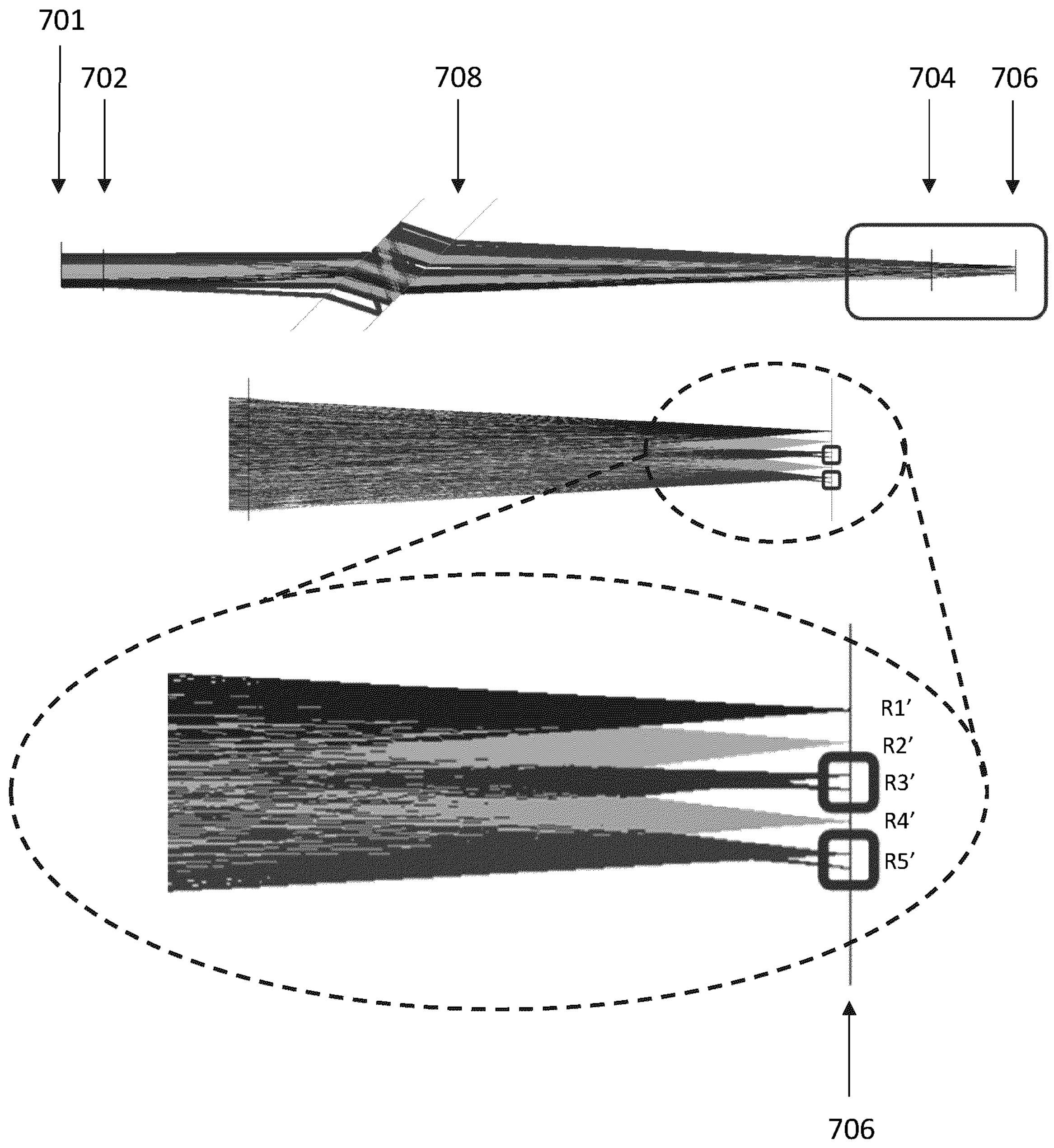
FIG. 7 shows how with a finite virtual image and waveguide pupil expander, ghost images can be formed.

The top part of FIG. 7 shows a system comprising a display device 702 propagating light 703, that has been encoded with (i.e., modulated in accordance with) a hologram displayed on the display device 702, towards an eye that comprises an entrance aperture 704 and a viewing plane 706. There is a light source (not shown) arranged to illuminate the display device 702. The system further comprises a waveguide 708 positioned between the display device 702 and the entrance aperture 704, to act as a pupil expander as described in detail in relation to FIG. **6*a*, above. The middle part of FIG. 7 shows a magnified view of the entrance aperture 704 and the viewing plane 706, and the lowest part of FIG. 7 shows a further magnified view of the viewing plane 706. This Figure is schematic and therefore physiological detail of the eye is not shown. In this arrangement, the eye perceives the virtual image 701 as being located at a finite distance, upstream of the display device 702**. The light rays are divergent because the virtual image distance is finite.

As per FIG. 6A, above, the presence of the waveguide 708 in FIG. 7 effectively enables the full diffractive angle of the display device 702 to be accessed at a relatively large projection distance, such that the full image content is visible to the user at the viewing position shown.

However, a further technical problem is introduced. Due to the divergent light and the resultant different light ray angles that are present, the different optical paths of light from different parts of the display device 702, for certain of the ray bundles, can lead to those ray bundles each forming multiple image points on the retina 706 when the virtual image is formed at a finite virtual image distance. This is shown in relation to the ray bundles labelled R3' and R5' in FIG. 7*a*. The additional image points that are formed, which are subsidiary to a main image point for a given point within the virtual image, can be referred to as 'ghost image points' and collectively they form 'ghost images' or simply 'ghosts'. As the person skilled in the art of image formation will appreciate, the formation of ghosts can cause blurring and a general decrease in the perceived quality of a virtual image, from the viewer's perspective. This is particularly true if the "ghost" partially overlaps the "main" image.

Figure 8:
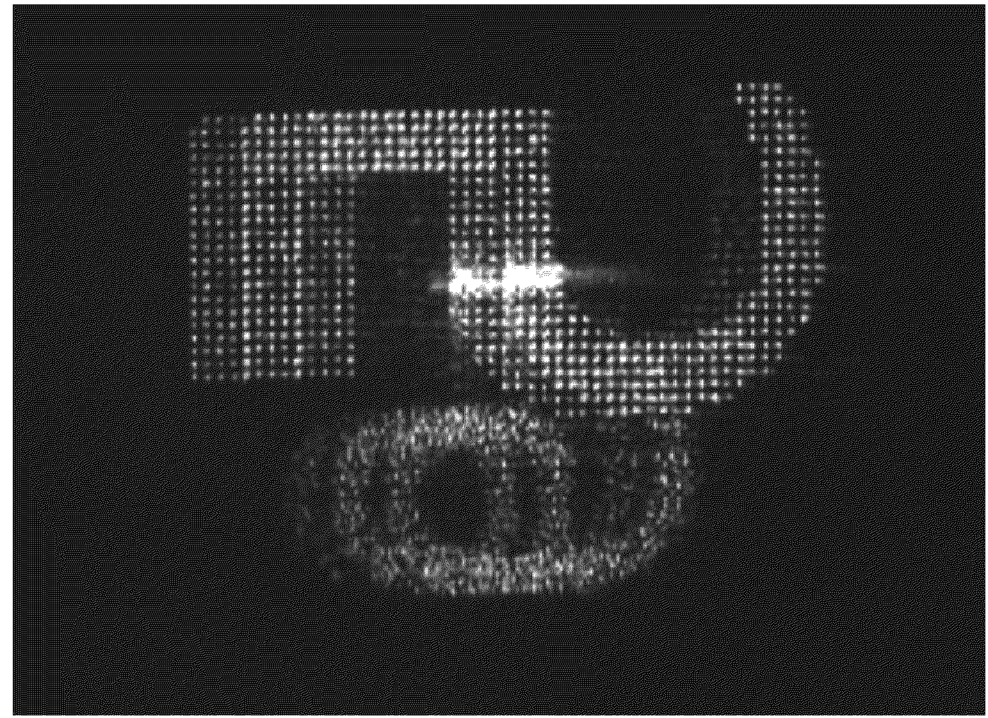
FIG. 8 shows a virtual image that comprises a primary image and two ghost images.

FIG. 8 shows an example of a virtual image of the numbers '5' and '9', created using a viewing system similar to that shown in FIG. 7*a*, that includes ghost images in addition to a main image. The main image can be seen as the brightest, central image for each number, with ghosts to the left and the right. In the example of FIG. 8, the '9' is formed when the viewing distance is larger than it is for the '5', therefore the blurring is more pronounced for it.

Hologram Calculation—Example 1

The inventors have addressed the problem of the ghost images. The inventors have recognised that it is desirable to provide a viewing system in which a virtual image can be formed at a finite virtual image distance, which comprises all the angular image content that is output by a display device, and which reduces or removes the formation of ghost images. Moreover, the inventors have found that, as the size of a viewing aperture increases in a conventional viewing system, the risk of forming ghost image points increases, because the aperture can admit additional light rays, which may form additional image points on the display plane. Therefore, it is desirable to provide an improved viewing system that can accommodate apertures of different sizes, whilst still reducing or removing the formation of ghost images. The solutions provided by the inventors, detailed below, are applicable to a range of different sizes of—and arrangements of—aperture, waveguide, and display device, and may be applied for different propagation distances, for which one or more ghost images may conventionally be formed. Moreover, they can be applied for relatively small display devices.

In overview, the inventors have recognised that it is possible to provide a light engine for generating a hologram that avoids or reduces the formation of ghost image points when the hologram is displayed on the display device and illuminated, whilst enabling the full image to be accurately viewed. The inventors have further recognised that it is possible to provide a hologram engine for provision of such a hologram, and to provide an improved viewing system for the display and illumination of an improved hologram, for the formation of improved images, even when the projection distances in the viewing system are relatively large and the display device and/or the viewing aperture is relatively small.

According to an embodiment, the inventors have identified that the hologram may be determined using a modelling method, such as a ray tracing method, such as a point cloud hologram calculation technique. The modelling, as devised by the present inventors, in effect identifies one or more areas of a display device that would, in a conventional arrangement, contribute to one or more ghost images, wherein the hologram is derived in order to control the contributions from those one or more areas of the display device, and thus to avoid or reduce the formation of ghost image points when the hologram is displayed on the display device and illuminated.

Other approaches for determining the hologram are also disclosed herein, as detailed below in relation to subsequent figures.

The inventors have recognised that, because of the angular restrictions imposed by having a viewing system that includes a waveguide—such as that shown in FIGS. 6A and 7A herein—comprising a relatively small viewing aperture, and optionally also a relatively small display device, it is possible to consider the different possible propagation paths within the waveguide separately. Moreover, they have recognised that, as a result of such consideration, it is possible to identify each of: areas of the display device that are the source of light contributing to a desired 'main' image; areas of the display device that are the source of light contributing to an undesirable 'ghost' image; and areas of the display device that are the source of light that is blocked by the aperture and thus do not contribute to either the main image or a ghost image. The inventors have further recognised that it is possible to limit the hologram calculation to only areas of the display device that contribute to the main image. They have further recognised that, in a further improvement, in some embodiments, an improved hologram may be provided, which in effect may cause one or more of the ghost images to be translated, so as to be superimposed onto a main image.

The recognitions made by the inventors, and the improved systems and methods embodying those recognitions, may be further understood with reference to the figures as detailed below.

Figure 9A:
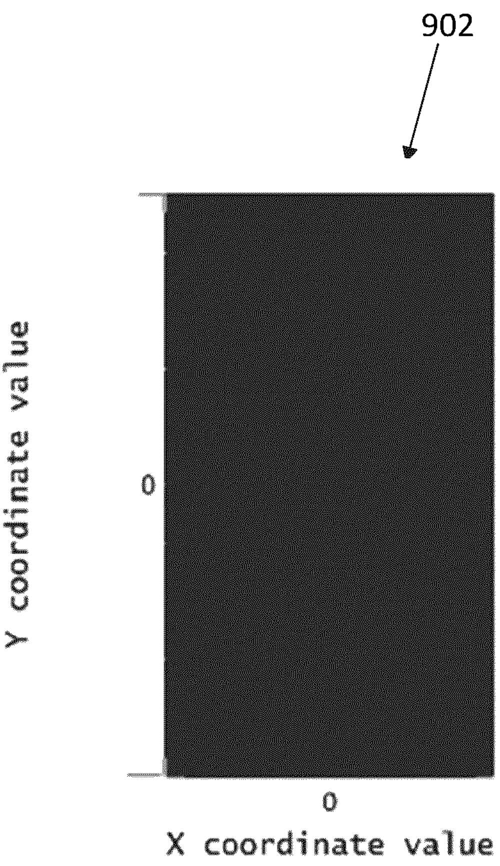
FIGS. 9A to 9C show an example in which the entire LCOS is used to form an primary image point and two corresponding ghost image points.
Figures 9B, 9C:
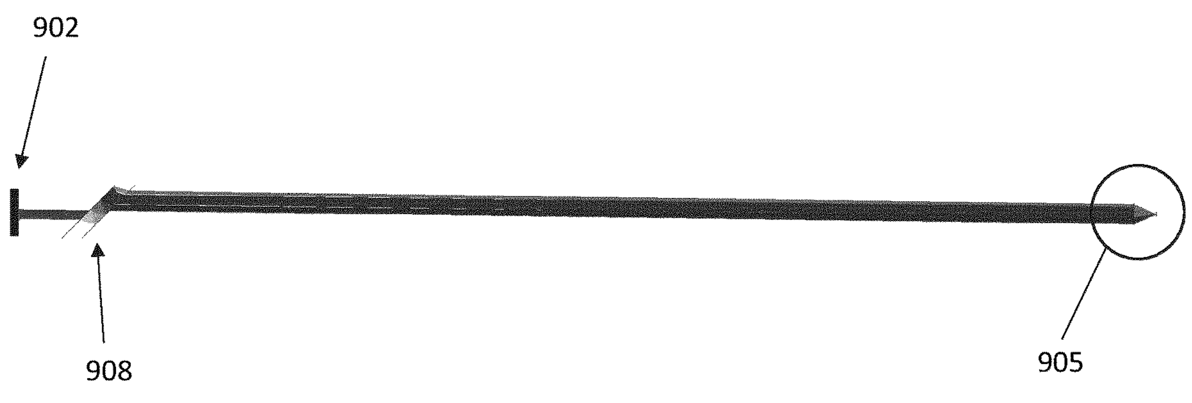

FIG. 9A shows a display device 902, which in this example is an LCOS spatial light modulator. Reference to "LCOS" in the following is made as shorthand for "display device". The teachings of the present disclosure are not limited to an LCOS display device. FIG. 9B shows the LCOS 902 and traces the light rays in relation to one virtual image point from the LCOS 902, via a waveguide 908, towards a viewing entity/system 905, which in this example comprises a viewer's eye. FIG. 9C further comprises a magnified view of the eye 905, showing the rays at the pupil 904 (i.e., the entrance aperture) and the retina 906 (i.e., the sensor or viewing plane). In this example, the entire LCOS area contributes to formation of the image point on the retina 906. In other words, the entirety of the LCOS 902 is 'visible' to the viewer. This contribution of the entire LCOS 902, to the image, is illustrated by the entirety of the LCOS being shaded, denoting its whole surface area as a 'contributory area'.

As can be seen, the light traced from the LCOS 902 in FIGS. 9B and 9C leads to the formation of three image points—labelled as G1, M and G2, respectively—on the retina 906 for this particular virtual image point. The middle image point 'M' comprises a main image point, which contributes to the primary/main virtual image perceived by the viewer. The top image point G1 comprises a first ghost image point and the bottom image point G2 comprises a second, different ghost image point of the same virtual image point. Notably, in a yet further advancement, the inventors have recognised that it is possible to identify the region(s) of the LCOS 902 that contribute to the main image point M and/or to the ghost image points G1, G2.

Figure 10A:
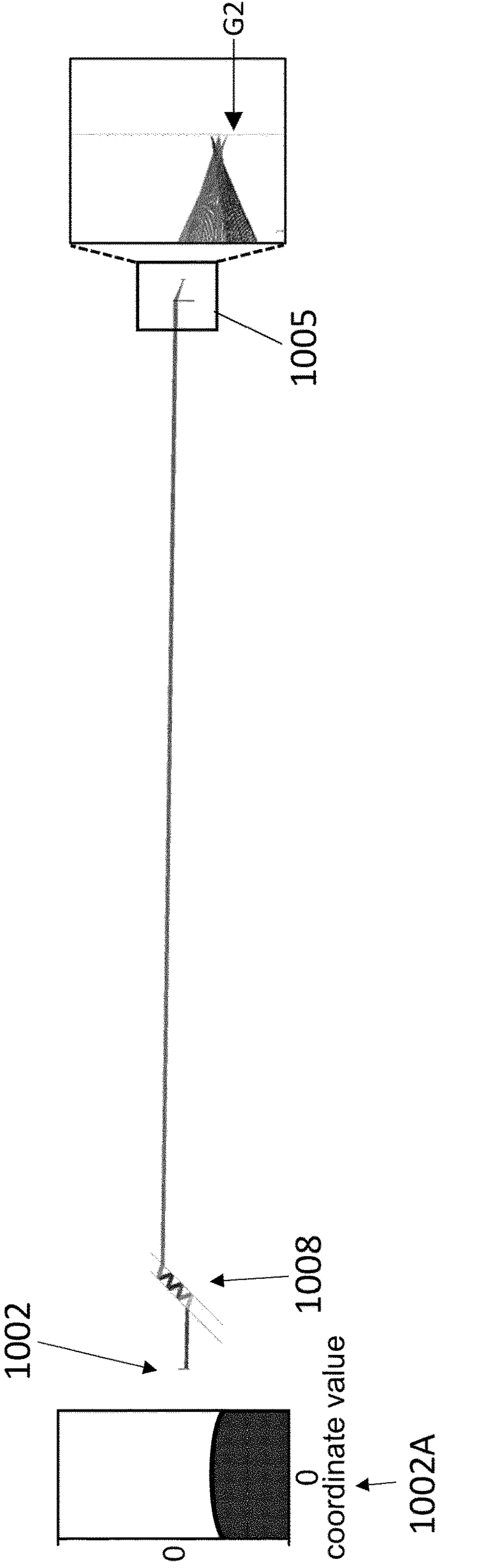
FIGS. 10A to 10C shows first, second and third propagation paths through a waveguide giving rise to a second ghost point, main image point and first ghost point, respectively.
Figures 10B, 10C:
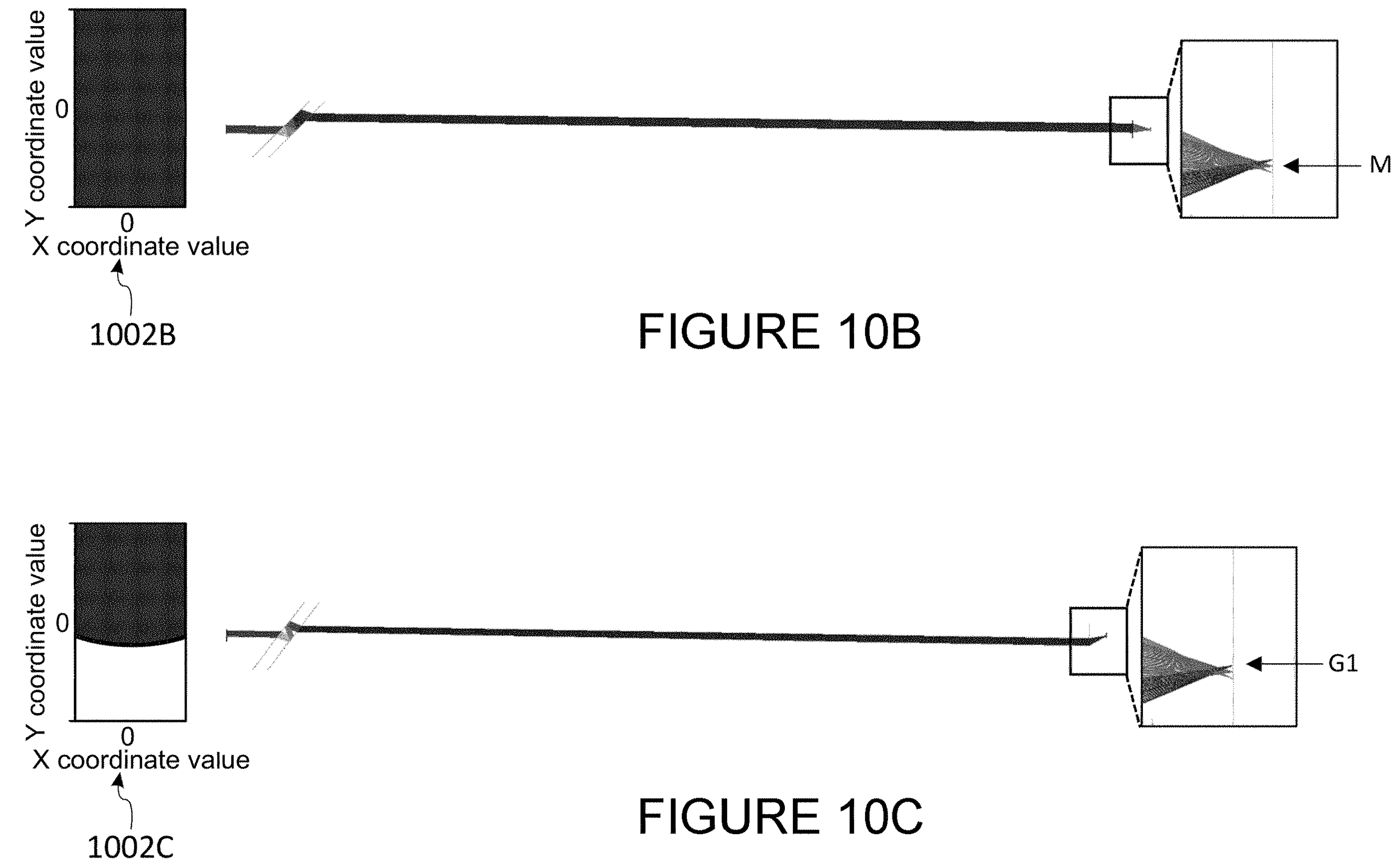

FIGS. 10A to 10C show the LCOS 902 and ray diagram of FIGS. 9A to 9C divided up into three respective propagation paths—the first of which comprises the light that contributes to the bottom ghost image point G2, the second of which comprises the light that contributes to the main image point M, and the third of which comprises the light that contributes to the top ghost image point G1. As can be seen in FIG. 10A, the light that contributes to G2 bounces three times before being transmitted by the waveguide 908. As can be seen in FIG. 10B, the light that contributes to M bounces twice before being transmitted by the waveguide 908. As can be seen in FIG. 10C, the light that contributes to G1 bounces once before being transmitted by the waveguide 908.

Each FIG. 10A, 10B, 10C) also shows, illustrated by shading, the portion(s) of the LCOS 902 that contribute to the respective image point. Thus, it can be seen that the bottom ghost image point G2 is contributed to by a region towards the lower part of the LCOS 902, the top ghost image point G1 is contributed to by a region towards the upper part of the LCOS 902, and the main image point is contributed to by the entire LCOS 902.

The aperture 904 (i.e., the viewer's pupil) is relatively wide in the example of FIGS. 9A to 9C and 10A to 10C, which explains why the entire LCOS 902 contributes to the main image point. In other words, the f-number of the viewing system is relatively low in this example. FIGS. 10A to 10C show that, although parts of the LCOS 902 also contribute to one or other ghost image G1, G2, there is a region of the LCOS 902 that contributes to neither ghost image G1, G2, but only contributes to the main image point M. The inventors have recognised that this region may be identified as being a contributory area, for the LCOS 902 in this example—more specifically, it may be identified as being a 'primary contributory area', as will be understood further from the description of the subsequent Figures. It can therefore be seen, in this case, that the primary contributory region is not limited to being a circle or ellipse and may take other more complex shapes.

Figure 11A:
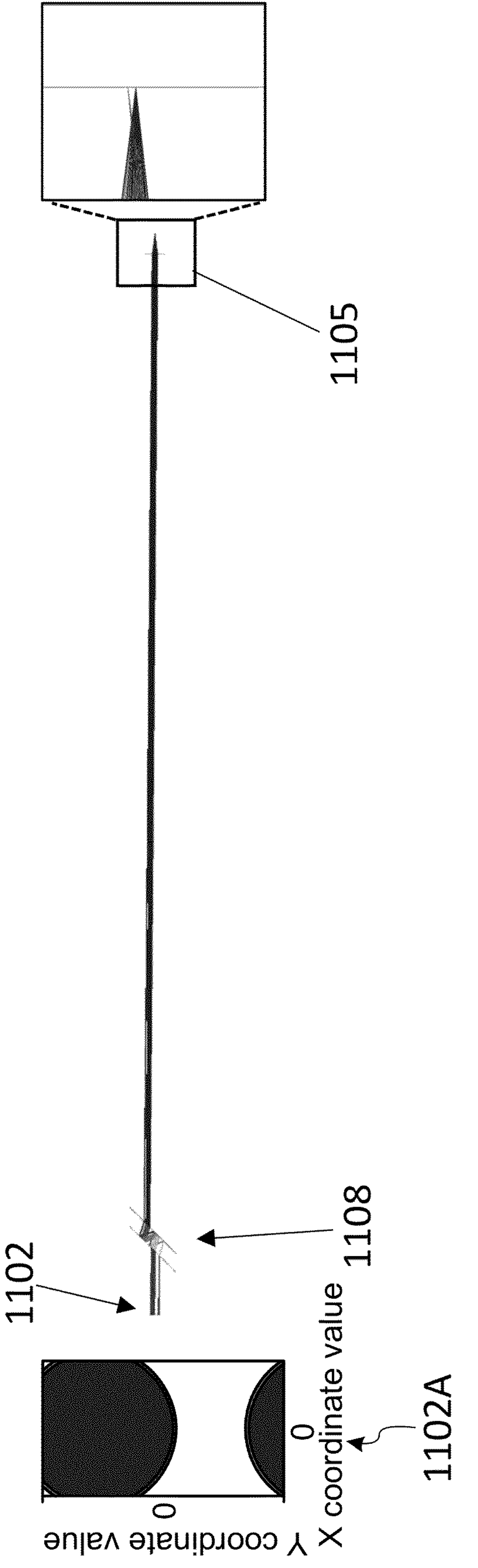
FIG. 11A to 11C shows three the propagation path and LCOS utilisation in relation to three different field/image points.
Figures 11B, 11C:
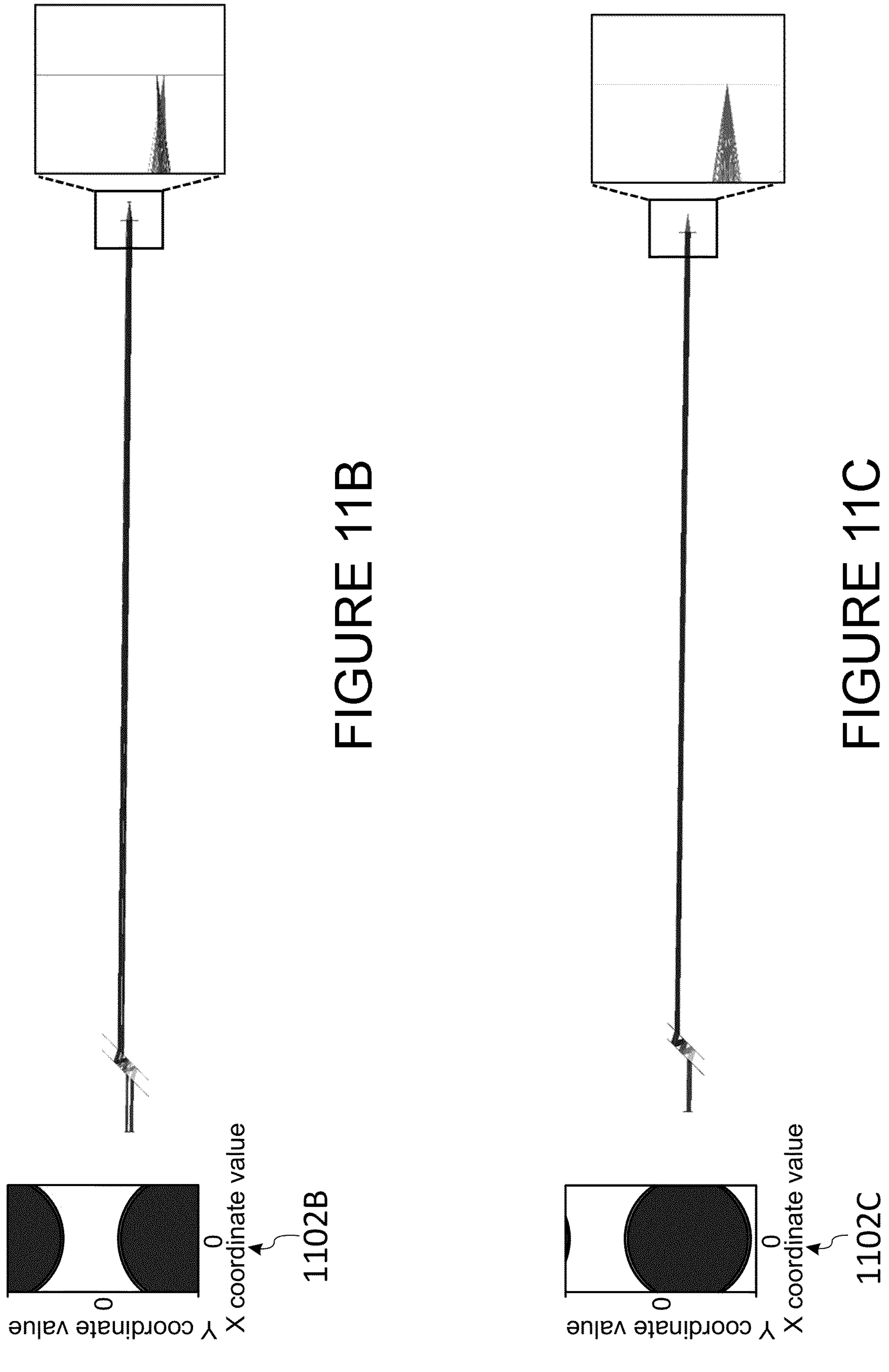

FIGS. 11A to 11C show the corresponding ray diagrams for different points of the virtual image when the entrance aperture is relatively small (i.e., the f-number is relatively high). FIG. 11A relates to a first field point of the virtual image (i.e., a first virtual image point), FIG. 11B relates to a second field point of the virtual image and FIG. 11C relates to a third field point of the virtual image. FIGS. 11A to 11C show that not all of the LCOS 902 contributes to the main image point. In fact, FIGS. 11A to 11C show that a first region of the LCOS correspond to the main image points (herein refer to as a "primary contributory area") and a second region of the LCOS corresponding to the ghost image points (herein referred to as a "secondary contributory area").

The inventors have recognised that, under certain conditions, different respective regions of the LCOS 902 (or other display device, in a viewing system) will contribute either to a main image or to a ghost image or will not contribute to any visible part of an image. They have further recognised that the hologram determination process can be optimised using this information. For example, light from certain parts of the display device may be omitted, or, in some cases, the manner in which those parts of the display device are encoded, by the hologram, may be changed so as to contribute positively to the main image, instead of contributing to a ghost image. Furthermore, additional areas of the display device may be identified, which may be configured to contribute to positively to the main image.

The recognitions made by the inventors will be described immediately below in relation to point cloud holograms by way of one example. However, they may be applied to other types of hologram such as a Fourier or Fresnel hologram, as detailed in relation to subsequent figures, later in this disclosure. That is, other hologram calculation methods can be optimised in accordance with the recognitions made by the inventors, as set out in this disclosure.

As will be well understood, usually for calculation of a point cloud hologram of an image (such as a virtual image), the image is broken down into (i.e., represented by) a plurality of individual points—referred to herein as 'virtual points', since we describe the formation of virtual images. A spherical wave (or 'wavelet') is then propagated computationally—i.e., using a model or other theoretical tool—from each virtual point, at its intended or desired location, within the virtual image, to the plane of the display device—such as the plane of the LCOS, in the examples described hereabove. The way in which such wavelets would interfere with one another is considered and the resulting amplitude and/or phase of the wavelet that would be received at each pixel of the display device is calculated. The display device can then be tuned, in a manner that is well known and so will not be described herein, to exhibit the amplitude and/or phase modulation that is required at each pixel location, in order to mimic the calculated wavelets, and thus to create a hologram of the image.

The inventors have recognised that, for a viewing system with a waveguide and large viewing distance as described herein, if the entire display device is populated with the net amplitude and phase of the corresponding wavelets of all the virtual points, the hologram that will be created may, when displayed and illuminated, generate one or more ghost images as well as a main image. In particular, this may occur when the viewing system is configured so that a virtual image is perceived at a finite distance from the viewer. Moreover, in many cases, light rays emitted from the pixels in some parts of the device will be wasted (i.e., they will not contribute to the image that the viewer sees or perceives) because the physical constraints of the viewing system (such as a small aperture and/or a small display device and/or a large projection distance) will dictate that light from those parts of the device will not enter the viewer's eye. Therefore, the inventors have recognised that an intelligent selection may be applied, in respect of which portions of the display device are tuned to provide a hologram. Specifically, if only those portions (or, parts, or, regions) of the LCOS that contribute to a main image are selected—and if wavelets are computationally propagated only from the virtual points of the intended virtual image, to those portions of the LCOS—and not to other portions of the LCOS, which do not contribute to the main image—the resulting amplitude and/or phase of the wavelet that would be received at each pixel within the selected region of the display device can be calculated. No calculation is needed for any respective other parts of the display device.

The display device can then be tuned, in accordance with the improved calculation, to exhibit the amplitude and phase modulation that is required at each pixel location, within the selected portion(s), in order to mimic the calculated wavelets, and thus to create a hologram of the main image. When this is done, there will be no need for tuning of any other portions of the LCOS, and therefore no image information will propagate from those other portions, to the viewer's eye (or other viewing entity), when the calculated hologram is displayed on the display device and illuminated. Therefore, there will be no information available to the viewer, which could lead to it forming an undesirable "ghost" image point. As a result, the ghost(s) is/are eliminated or 'quenched'. Moreover, no computation or image information is wasted, since only those pixels of the display device that are known to provide light that will be admitted through the viewer's pupil (or, through the aperture of a corresponding other viewing entity), for a given set of conditions (such as for a particular aperture width and location of the eye), will be tuned.

Figure 12A:
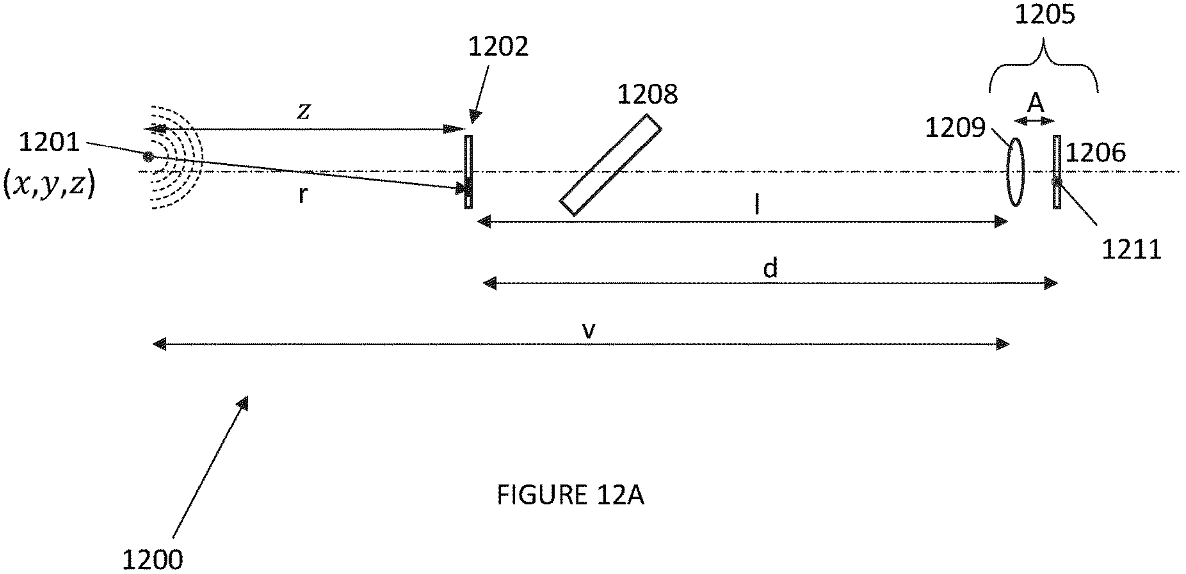
FIG. 12A shows a viewing system including a virtual image point and an image of that virtual image point formed by a viewing system and waveguide.

FIG. 12A shows a system 1200 forming a virtual image comprising an example virtual point 1201. The viewing system 1200 comprises a display device 1202, which in this example is an LCOS SLM, which comprises a contributory area 1203 and a non-contributory area 1207, identified in accordance with the present disclosure. The display device 1202 is arranged to display a hologram of the virtual image and to project light that has been encoded in accordance with the hologram, towards an eye 1205 that comprises a pupil (not shown) that acts as an aperture, a lens 1209, and a retina 1206 that acts as a viewing plane. The lens 1209 and retina are separated by a separation distance 'A'. There is a light source (not shown) arranged to illuminate the display device 1202. The viewing system 1200 further comprises a waveguide 1208 positioned between the LCOS 1202 and the eye 1205. This image is schematic and therefore physiological detail of the eye is not shown.

The virtual point 1201 is located upstream of the display device 1202, which in FIG. 12A is depicted by the virtual point 1201 being to the left of the display device 1202. The virtual point 1201 has a location defined by spatial coordinates, which in this example comprise Cartesian (x, y, z) coordinates but other coordinate systems or other means of identifying the virtual point's location may be used. A distance 'z' is defined between the virtual point 1201 and the display device 1202, in a direction substantially parallel to the optical axis of the display device 1202. There is also a display-to-lens distance 'l' defined between the display device 1201 and the eye lens 1209 is, in a direction substantially parallel to the optical axis of the display device 1201. The numerical values of both 'z' and 'l' will vary dependent on the particular arrangements of the viewing system 1200, at a given time, including viewer position. For example, the display-to-lens distance 'l' may be of the order of approximately 1 metre and the display-to-image distance 'z' may be larger, for example of the order of a few metres. But these numerical examples are purely illustrative and should not be regarded as being limiting.

The inventors have recognised that, if a virtual image comprising the virtual image point 1201 is to be perceived, by a viewer, at the location depicted in FIG. 12, a corresponding image point 1211 must be formed on the retina 1206. Light rays can be traced from the virtual point 1201 of the virtual image to a corresponding point 1211 on the retina 1211, via the LCOS 1202.

It will be appreciated that more than one possible optical path may be taken, between the virtual point 1201 and its corresponding point 1211 on the retina, via the LCOS 1202 owing to the possible paths created/generated by the waveguide 1208. According to embodiments, a chief light ray may be determined, which comprises a light ray path amongst a plurality of light ray paths, between the virtual image point 1201 and the corresponding point 1211, on the viewing plane (i.e., the retina 1206). When this chief ray path is identified, the number of bounces that the light of the chief ray undergoes within the waveguide is determined. That number of bounces (B) can be set as being the number of bounces for which rays should be traced, between the virtual image and the viewing plane. According to embodiments, the chief ray—and the associated number (B) of bounces—may be identified, as an initial step.

In the present example, ray tracing can determine the portion of the LCOS 1202 through which the 'chief ray' light travels, between the virtual image point 1201 and the corresponding point 1211 on the retina, in order to identify the 'contributory area' 1203 for that virtual image point 1201. There is therefore a light ray 'r' depicted as propagating between the virtual image point 1201 and the contributory area 1203 of the display device 1202 in FIG. 12. In accordance with the recognitions made by the inventors, only wavelets contributing to the contributory area of the LCOS need to be modelled (or otherwise computationally considered), from the virtual image point 1201 and the display device 1202. In other words, only the identified contributory area 1203 of the display device 1202 needs to be encoded (or, 'tuned')—in order to generate an appropriate hologram. Such a hologram, when encoded on the display device and suitably illuminated, would enable the virtual image point 1201 to be perceived by the viewer without any ghost images of that virtual point 1201 also being present. This can be understood further from FIGS. 13 and 14, discussed below.

Figure 12B:
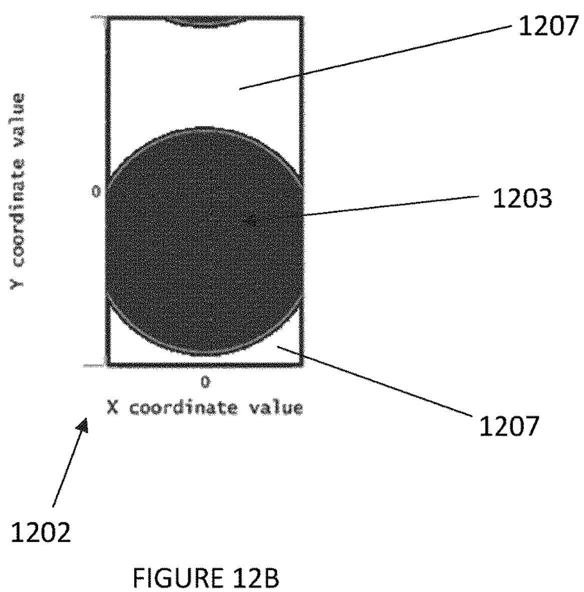
FIG. 12B shows the primary contributory area of the LCOS in relation to the example of FIG. 12A.

The contributory area 1203 in FIG. 12B—and the contributory areas discussed in relation to FIGS. 13 and 14 below—may be located in accordance with the intersection of the chief ray with the display device. For example, the contributory area may be centred around the point at which the chief ray intersects the display device. The contributory area may be sized and shaped based on the size and shape of the entrance aperture of the corresponding viewing entity and of the associated optics (e.g., waveguide geometry, any reflections within a larger optical system, and so on). Therefore, when the viewing entity is a human eye, the contributory area on the display device may, in some cases, comprise a substantially circular, or elliptical, shape, or any other suitable shape such as a complex shape, of a similar size to the receiving pupil. However, the present disclosure encompasses more complex shapes for the contributory area. Eye pupil diameter may be measured or estimated in any suitable way. For example, measurement of the eye pupil diameter may be carried out by an eye tracking system. Alternatively, it may be estimated based on known ranges of pupil diameter of the eye (e.g. 2-6 mm) or based on another estimate given the ambient light conditions at a given time.

The contributory area may be set so as to deliberately contribute to an area (on the aperture plane) that is a little larger than the pupil, and/or to contribute to an area (on the aperture plane) that is a slightly different shape to the pupil (or other aperture). In such a case, not all light from a "contributory area" may pass through the pupil at all times, but the eye would be able to move around a little while still collecting sufficient light to form a good image on the retina.

Figure 13:
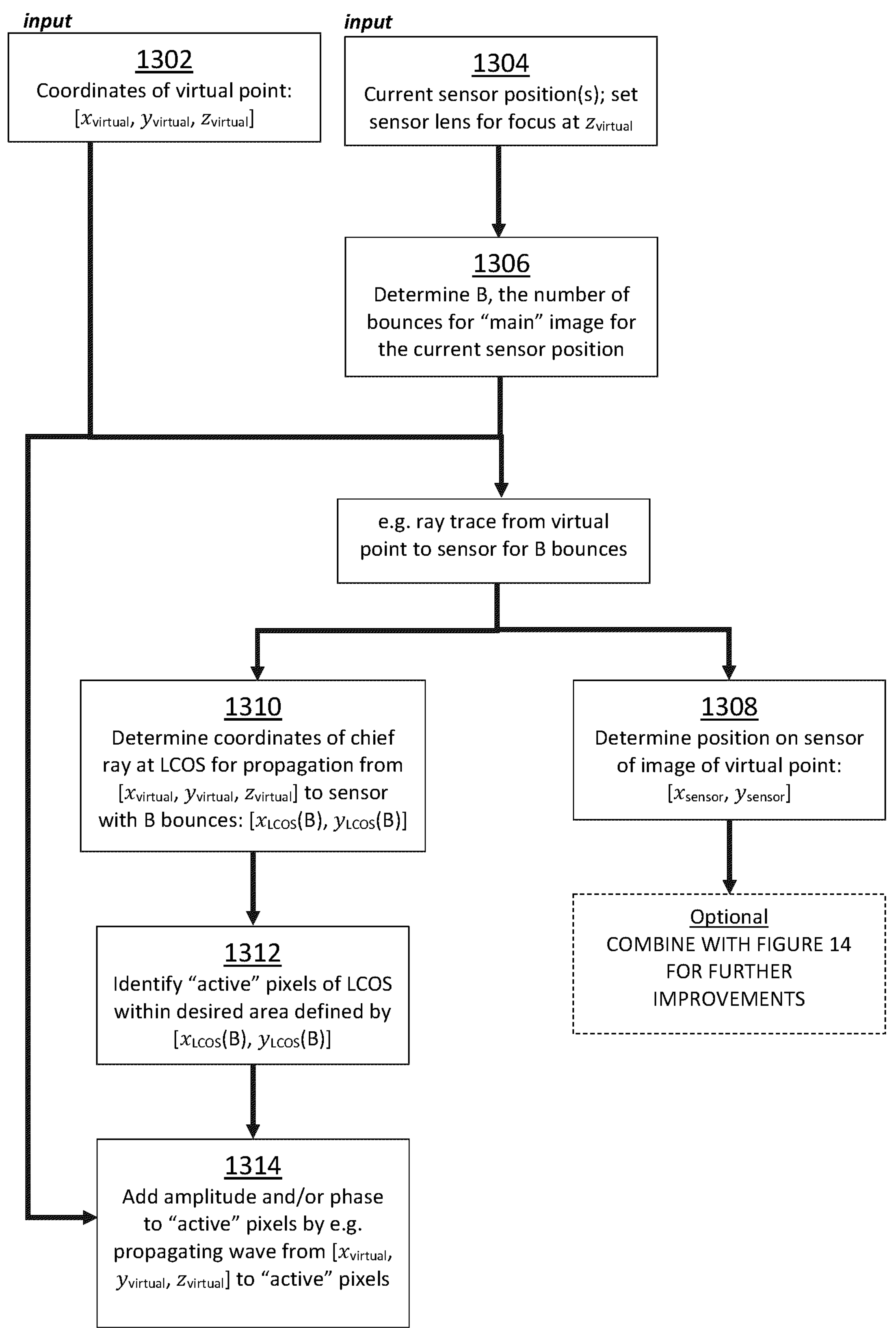
FIG. 13 shows a flow chart of an improved method to derive an improved data structure in accordance with embodiments.

FIG. 13 shows a method for determining the contributory and non-contributory areas of the display device, in accordance with an aspect of this disclosure. Optionally, these determinations can then be used to optimise generation of one or more holograms for display and illumination by a viewing system such as the system 1200 of FIG. 12. In the method described with reference to FIG. 13, the viewing system comprises a lens having an 'f'-number (i.e., focal length and aperture) and camera. The light-sensitive component of the camera may be, for example, a CCD array and is positioned on the viewing plane. Functionally, the lens and camera substitute the eye lens and retina of the human eye of a viewer and are solely used for the process of determining the contributory and non-contributory areas of the display device. These areas of the display device may be determined for a plurality of viewing positions (e.g. eye positions within a eye-motion box) and/or a plurality of image distances (e.g. virtual image distances in front of a vehicle). In some respects, the method disclosed with reference to FIG. 13 may be considered a precursor to hologram calculation. The method may be considered an optimisation or even a calibration process.

As will be well understood, each virtual image that is to be generated can be represented by one or more virtual image points, each with a corresponding location—for example, as defined by (x, y, z) coordinates. Steps one 1302 to six 1312 (detailed below) of the method 1300 of FIG. 13 may be applied separately to each virtual image point, within a virtual image that is to be created. Moreover, the method 1300 applies for a specific set of conditions—i.e., for particular measurements and constraints, of the viewing system. Therefore, any given iteration (or, 'run') of the method 1300 applies for building up a particular image that is to be created (virtual image point by virtual image point), and for when the system has a particular display-to-image distance 'z', a particular distance 'd' between the display device and the retina, a particular aperture (pupil) width, and a particular virtual image distance at which the eye is focused An iteration of the method 1300 is also specific to a particular size and type of display device, and for a particular position of the eye, with a permitted viewing window. There may be other measurements and/or constraints, to which each iteration of the method is specific. According to embodiments, if any of those measurements or constraints change, the method 1300 may be re-run, to re-determine the contributory area(s) of the display device under the changed circumstances. It will be understood, however, that, according to embodiments, certain tolerances may be applied to one or more of those measurements or constraints, such that the method may not have to be re-run if they change by less than a predetermined amount and/or for less than predetermined length of time. The rules regarding when the method should be re-iterated may be determined on a per-system basis.

The method 1300 may be performed by a suitable processor. The processor may comprise, or be comprised within or in communication with, a hologram engine. The processor or hologram engine may be comprised within a light engine.

The processor may obtain or receive boundary information regarding the viewing system before the method 1300 is carried out. For example, it may obtain or receive information regarding the size of components such as the display device, information regarding the absolute and/or relative positions of various components and of the viewing system (e.g., potential human viewer), information regarding the light source, and so on.

According to the method 1300, in a first step 1302 the location—e.g., the coordinates $[x_{virtual}, y_{virtual}, z_{virtual}]$—of the virtual image point (also referred to herein as the "virtual point" for shorthand) is obtained, in accordance with the location at which the virtual image is to be perceived. The virtual image distance between the lens 1209 and the virtual point is then obtained or determined. This virtual image distance may be set or determined by the processor that is performing the method 1300, or it may be set or determined by another entity, and communicated to that processor. It may be pre-set or selected from a plurality of possible virtual image distances, in some arrangements. In real-world operation, when the viewing system is an eye, eye-tracking or head-tracking information may be used in the determination of the virtual image distance.

In a second step 1304 the required distance 'A' between the lens and the sensor is determined for focus on the virtual image point. Each virtual image point can also be defined by an angle—see FIG. 4. Reference herein to "angular content" is made with respect to the virtual image points of the virtual image.

In a third step 1306, a number of reflections or bounces 'B' of light within the waveguide associated with a main or primary image formed by the viewing system is determined. The person skilled in the art of optics will appreciate that the waveguide generates a plurality of replicas of the light associated with the virtual image point and each replica may be associated with a different number of light bounces/reflections within the waveguide. By way of example only, one way to determine B is to determine the intersection of the chief ray with the display device for each possible light propagation path in the waveguide and select the number of reflections/bounces that puts the chief ray closest to the centre of the display device. Advantageously, this approach is such that the area of the display device contributing to the viewing system is largest.

Alternatively, another way of calculating the number of bounces to use in the third step 1306 comprises sub-steps 1 to 5 below:

1. Eye position known and used as input
2. Ray trace from the centre of the display device to the determined eye position for a first number of bounces, B. The extrapolation of that ray towards the virtual image defines an angle in the field of view (θB) for this number of bounces (B).
3. Ray trace from the centre of the display device to the determined eye position for a second number of bounces, B+1. The extrapolation of that ray towards the virtual image defines an angle in the field of view ($\theta_{B+1}$) for this number of bounces (B+1).
4. B is the number of bounces used for angular content between $\theta_B$ and $\theta_B+(\theta_{B+1}-\theta_B)/2$
5. B+1 is the number of bounces used for angular content between $\theta_B$ $(\theta_{B+1}-\theta_B)/2$ and $\theta_B$ The output from the first step 1302 (i.e., the coordinates of the virtual image point) and third step 1306 (the parameter, B) are used in a fourth step 1308 to determine the corresponding image position/point on the sensor $[x_{sensor}, y_{sensor}, z_{sensor}]$. That is, the fourth step 1308 determines the point on the sensor on which light of the virtual image point is received. In other words, the point on the sensor at which the virtual image point is imaged. This point on the sensor is referred to below, in relation to FIG. 14, as the main image point $[x_{sensor}, y_{sensor}, z_{sensor}]$. By way of example only, computational ray tracing from the virtual point to the sensor for B bounces within the waveguide may be used but the present disclosure is not limited to this approach to the fourth step.

The person skilled in the art will appreciate that a chief light ray (or simply chief ray) from the virtual point $[x_{virtual}, y_{virtual}, z_{virtual}]$ to the point on the sensor $[x_{sensor}, y_{sensor}, z_{sensor}]$ may be identified. Again, computational ray tracing may be used to identify or trace the chief ray but other methods are equally applicable. In a fifth step 1310, a display device intersection point $[x_{LCOS}(B), y_{LCOS}(B), z_{LCOS}(B)]$ is identified, wherein the display device intersection point is the location on the display device at which the chief ray intersects the display device. The display device intersection point may be determined, calculated, or measured, for example by computational ray tracing.

In a sixth step 1312, an area of the display device associated with the display device intersection point [$x_{LCOS}$(B), $y_{LCOS}$(B), $z_{LCOS}$(B)] is identified. The area of the display device may be geometrically centred on this point [$x_{LCOS}$(B), $y_{LCOS}$(B), $z_{LCOS}$(B)]. For example, the area may be a circle or ellipse but other more complex shapes may be envisaged. If the area is a regular shape, such as a circle or ellipse, the radius of the area may be determined—for example, in accordance with the f-number of the lens of the viewing system. The area is referred to herein as a "primary contributory area" because it corresponds to a primary image formed by the viewing system. The word "contributory" reflects that the pixels of the display device within the identified area of the display device are the pixels that provide the necessary information content to the sensor. Other areas of the display device (i.e., other pixels of the display device) do not contribute to formation of the image point on the sensor. The other pixels may, of course, contribute to other image points on the sensor associated with other virtual image points.

The method in accordance with the primary aspect of the present disclosure ends with determination of the primary contributory area of the display device. Optionally, a hologram may be determined based on the primary contributory area—rather than on the entire area of the display device.

Accordingly, in an optional, seventh step 1314, a hologram component is determined for the primary contributory area based on the virtual point. Specifically, light parameters for the primary contributory area are determined. The light parameters may be amplitude and/or phase for each pixel of the primary contributory area. For example, a light amplitude and phase may be determined for each pixel within the primary contributory area based on the propagation of light from the virtual point to the primary contributory area using a point cloud method familiar to the person skilled in the art. The hologram component for the virtual point may be stored and combined with the hologram component for the other virtual points as part of the iterative process described in the following paragraph in order to build up a complete hologram for the entire virtual image.

In overview, the seventh step 1314, a light modulation value (e.g. an amplitude and/or phase value) is assigned to each pixel value of the display device within the primary contributory area. This is achieved by considering the propagation of a light wave from [$x_{virtual}$, $y_{virtual}$, $z_{virtual}$] to the primary contributory area and adding the amplitude and/or phase to the pixels of the display device within the desired radius of [$x_{LCOS}$(B), $y_{LCOS}$(B), $z_{LCOS}$(B)]. That is, the amplitude and/or phase of light originating from the virtual image point and arriving at each point (i.e., pixel) of the primary contributory area is determined by considering the propagation of the light wave—that is, the amplitude and/or phase of the light wave after travelling the distance from the virtual image point to each pixel. This determination may be performed by any one of a number of different techniques known to the person skilled in the art of optics. This determination may be made by experimental measurement.

The first to seventh steps may be repeated for each virtual point, within a virtual image that is to be projected using the hologram. For example, the plurality of hologram components may be added together, to produce a resultant hologram for each pixel of the display device. For example, the complex amplitude may be added up at each pixel for propagation from all virtual image points. If the hologram is to be displayed on a phase-only modulator, the amplitude component of the resulting complex amplitude sum may be ignored, leaving only the phase. More broadly, this resultant is a diffractive structure corresponding to the virtual image which, if displayed and illuminated on the display device within the viewing system, forms the virtual image.

The hologram can be displayed or encoded on to the display device. As a result, the display device will be tuned to modulate light in a manner that enables the virtual image to be perceived by the viewer, at the required virtual image distance.

The method 1300 may be carried out substantially simultaneously (or in very quick succession) for each of a plurality of virtual points within a virtual image, so that a suitable hologram for the whole virtual image may be derived and encoded on to the display device very quickly, for a given viewing set up and for particular numerical measurements and constraints. If anything changes that might affect the identification of the contributory area(s), and/or the required tuning of the display device, the method may be re-run. The processor may be configured to re-run the method on a time-controlled loop, and/or in response to a signal indicating that a change has occurred, and/or when the content or identity of the required virtual image changes. The processor may include, or may be in communication with, a memory, for storing previously-calculated data. For example, a look up table or other storage means may be provided, which indicates the active area(s) of the display device, for a particular virtual image or virtual point, under a specific set of measurements and/or constraints.

The method 1300 may be run (or re-run) very quickly, in order to display a number of different virtual images in quick succession, and/or to respond accurately to changes in conditions such as movement of the user. Although only one eye is shown in the system of FIG. 12, the method 1300 can be configured to consider both the viewer's eyes and/or another viewing system with two or more entrance apertures. Moreover, although certain of the descriptions above may refer to an aperture width, it will be appreciated that a pupil (and most other apertures, for viewing entities) is two dimensional and can change size in each of those two dimensions. The method 1300 may be configured to take two-dimensional aperture size, and changes thereto, into consideration.

The inventors found that a hologram of a virtual image could be efficiently determined using the method disclosed with reference to FIG. 13. However, the inventors also observed that in some cases only a relatively small portion of the LCOS was being utilised, when all areas of the LCOS that would conventionally propagate light that would form ghost images were not used. In a notable further technical advancement, the inventors found ways to use additional areas of the LCOS, in additional to the primary contributory area, and to calculate hologram values for those additional areas that would enable them to contribute light to reinforce the primary image, rather than forming unwanted ghost images.

As will be well understood, the optical path that a light ray takes through a waveguide in a viewing system may increase its path length, vis-à-vis the path lengths for respective other rays. Typically, such increases are likely to be small in comparison with the virtual image distance 'v', and so will not be visible to the eye.

Figure 14:
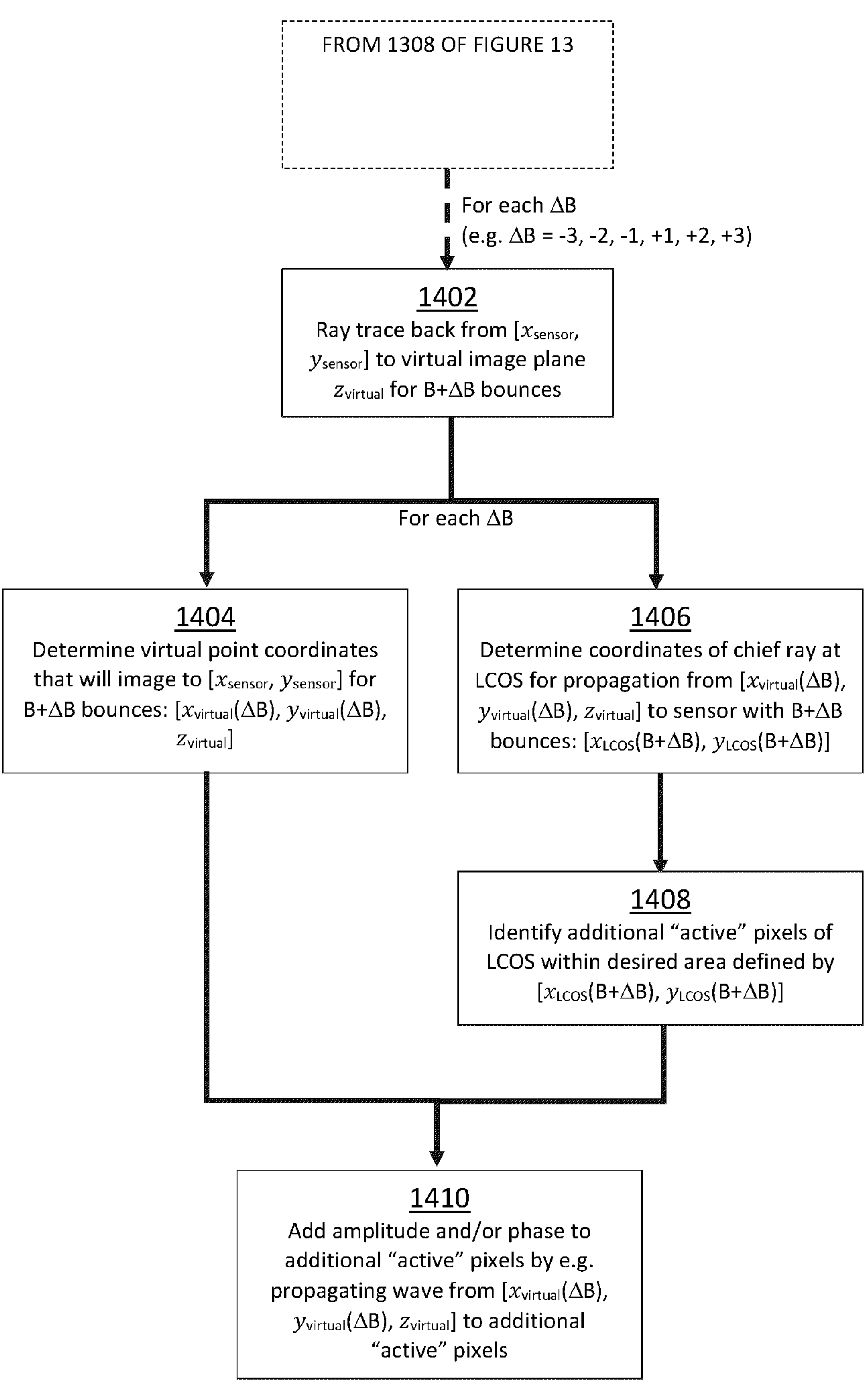
FIG. 14 shows a flow chart of a further improved method to derive an improved data structure in accordance with embodiments.

FIG. 14 shows a yet further improved method 1400, in accordance with additional recognitions made by the inventors, which can be applied for a system such as the system 1200 of FIG. 12. The method 1400 of FIG. 14 comprises all the steps of the method 1300 of FIG. 13 and, in addition, it comprises processing of one or more of the ghost image points, corresponding to the virtual point, which may also be present, and which conventionally would lead to the perception of one or more ghost images of the virtual image.

The method 1400 may be performed by a suitable processor. The processor may comprise, or be comprised within or in communication with, a hologram engine. The processor or hologram engine may be comprised within a light engine.

The processor may obtain or receive boundary information regarding the system before the method is carried out. For example, it may obtain or receive information regarding the size of components such as the display device, information regarding the absolute and/or relative positions of various components and of the viewer, information regarding the light source, and so on.

In some cases, the inventors have found that the ghost image points arise due to light, from the corresponding virtual point, travelling through a part of the display device that is different to the 'primary contributory area', through which the chief ray of the main image travels. In preceding Figures herein, such parts of the display device are referred to as being 'secondary contributory areas'. The light that creates one or more ghost image points, may be referred to as comprising one or more 'ghost rays'. The light rays giving rise to the ghost image may undergo a different number of bounces, within the waveguide, to those corresponding to the main image, in order to also travel through the narrow pupil of the viewer's eye and coincide with the retina. Therefore, if it is determined that the chief ray corresponding to the main image undergoes 'B' bounces within the waveguide, it may be determined that the light corresponding to a ghost image undergoes 'B+ΔB' bounces, where AB may be a negative or positive whole number, usually a single digit number, for example in the range from −5 to +5.

According to the improved method 1400 of FIG. 14, after the fourth step 1308 of the method 1300 of FIG. 13, in which the location of the main image point on the viewing plane is established—for example, its coordinates ($x_{sensor}$, $y_{sensor}$, $z_{sensor}$)—the subsequent steps of the method 13 of FIG. 13 may continue and, in addition, for example in parallel or at a later time, a further set of steps may be performed, as follows, for at least one value of AB. In summary, the improved method 1400 of FIG. 14 determines how many bounces 'B+ΔB' a ghost ray would have undergone, from the coordinates [$x_{virtual}$, $y_{virtual}$, $z_{virtual}$] of the virtual point, in order to form a ghost image point at the viewing plane. Then, the improved method 1400 determines a translated (or, amended) location of the virtual point, from which light could travel and undergo 'B+ΔB' bounces within the waveguide and arrive at the main image point on the viewing plane, rather than forming a separate ghost image point. A location on the LCOS, via which a light ray travels, from the translated location of the virtual point, to the main image point, may then be identified and may be encoded with a hologram, accordingly. Thus, one or more additional areas of the LCOS (other than the primary contributory area) may be encoded with hologram values to contribute to the main image, whilst still avoiding the creation of ghost images.

In more detail, the improved method 1400 is as follows:

In a first further step 1402, light rays from the main image point ($x_{sensor}$, $y_{sensor}$, $z_{sensor}$) are traced back to the virtual image, but for light rays that undergoes 'B+ΔB' bounces/reflections (rather than B bounces), within the waveguide.

In a second further step 1404, the location—e.g., the coordinates [$x_{virtual}(\Delta B)$, $y_{virtual}(\Delta B)$, $z_{virtual}(\Delta B)$]—are determined (e.g., as a result of the ray tracing that was performed at the first further step 1402), of a secondary virtual point of the virtual image that would image to the main image point [$x_{sensor}$, $y_{sensor}$, $z_{sensor}$]—i.e., that would propagate light that would travel through the display device, waveguide and entrance aperture to coincide with the viewing plane at the location [$x_{sensor}$, $y_{sensor}$, $z_{sensor}$]—if the light underwent 'B+ΔB' bounces. The term 'secondary virtual point' is used herein as shorthand for a secondary (i.e., a displaced, or amended) location of the (primary) virtual point. That is, the present inventors have recognised that, if the location of the virtual point was shifted to the 'secondary virtual point' location [$x_{virtual}(\Delta B)$, $y_{virtual}(\Delta B)$, $z_{virtual}(\Delta B)$], any light from the 'secondary virtual point' that underwent 'B+ΔB' bounces/reflections in the waveguide would contribute to the main image, at the viewing plane.

In summary, a third further step 1406 comprises determining the coordinates [$x_{LCOS}(B+\Delta B)$, $y_{LCOS}(B+\Delta B)$, $z_{LCOS}$] of a chief ray at the display device for light propagation from [$x_{virtual}(\Delta B)$, $y_{virtual}(\Delta B)$, $z_{virtual}$] to the viewing plane for B+ΔB bounces within the waveguide. In some cases, $z_{virtual}$ may be adjusted to take account of the different path length through the waveguide (i.e., because of the different number of bounces. This chief ray may be referred to as a 'secondary chief ray'.

In more detail, in the third further step 1406, a point on the display device is identified where the 'secondary chief ray' from the secondary virtual point to the main image point [$x_{sensor}$, $y_{sensor}$, $z_{sensor}$] would travel, undergoing B+ΔB bounces in the waveguide, via this point. This point on the display device has the coordinates [$x_{LCOS}(B+\Delta B)$, $y_{LCOS}(B+\Delta B)$, $z_{LCOS}$].

In a fourth additional step 1408, the point [$x_{LCOS}(B+\Delta B)$, $y_{LCOS}(B+\Delta B)$, $z_{LCOS}$] is assigned a radius or other suitable indicator of the extent, or size, of an area associated therewith. The area associated with the point [$x_{LCOS}(B+\Delta B)$, $y_{LCOS}(B+\Delta B)$, $z_{LCOS}$] is referred to herein as an "additional contributory area" because it propagates light that contributes to the main image point at the viewing plane, but only when that light originates from a displaced, or amended, location of the (primary) virtual point—i.e., [$x_{virtual}(\Delta B)$, $y_{virtual}(\Delta B)$, $z_{virtual}$] not [$x_{virtual}$, $y_{virtual}$, $z_{virtual}$] as determined in the second further step 1404.

The fourth further step 1408 is similar to the sixth step 1312. Specifically, the fourth further step 1408 comprises identifying an area of the display device associated with the display device intersection point [$x_{LCOS}(B+\Delta B)$, $y_{LCOS}(B+\Delta B)$, $z_{LCOS}(B)$]. The area of the display device may be geometrically centred on this point [$x_{LCOS}(B+\Delta B)$, $y_{LCOS}(B+\Delta B)$, $z_{LCOS}(B)$] For example, the area may be a circle or ellipse but other more complex shapes may be envisaged. If the area is a regular shape, such as a circle or ellipse, the radius of the area may be determined—for example, in accordance with the f-number of the lens of the viewing system. The area is referred to herein as an "additional contributory area" because it will propagate light contributing to the virtual image, if an appropriate hologram is calculated based on the displaced, or amended, location of the (primary) virtual point.

A fifth further step 1410 is similar to the seventh step 1314. The fifth further step 1410 is optional. In the fifth further step 1410, a hologram component is determined for the additional contributory area based on the amended location of the (primary) virtual point, [$x_{virtual}(\Delta B)$, $y_{virtual}(\Delta B)$, $z_{virtual}$]. Specifically, light parameters for the additional contributory area are determined. The light parameters may be amplitude and/or phase for each pixel of the additional contributory area. For example, a light amplitude and phase may be determined for each pixel within the additional contributory area based on the propagation of light from the different virtual point, [$x_{virtual}(\Delta B)$, $y_{virtual}(\Delta B)$, $z_{virtual}$], to the additional contributory area using a point cloud method familiar to the person skilled in the art. The hologram component for the different virtual point, [$x_{virtual}(\Delta B)$, $y_{virtual}(\Delta B)$, $z_{virtual}$], may be stored and combined with the hologram component for the other virtual points as part of the iterative described in the following paragraph in order to build up a complete hologram for the entire virtual image.

This required light modulation, by the display device, which is output in relation to a single individual virtual point, may be referred to as a "hologram component" for that virtual point. The hologram component may be stored, by the processor, during a subsequent repetition of the method 1300 for one or more other virtual points, within the virtual image that is to be created.

The steps 1402 to 1410 of the further improved method 1400 of FIG. 14 may, along with the steps one 1302 to seventh 1314 of the method 1300 of FIG. 13, be repeated for each virtual point, within a virtual image that is to be created. When the modulation behaviours, and corresponding hologram components, for each virtual point have been determined, the hologram components may be added together, to produce a resultant modulation behaviour for each pixel of the display device. This resultant modulation behaviour represents a diffractive structure, or hologram, for the virtual image, which, if displayed and illuminated on the display device within the viewing system, leads only to a main image being formed and does not form any ghost images. The main image that would be formed as a result of the improved method 1400 of FIG. 14 being carried out may be brighter than a corresponding main image resulting from the method 1300 of FIG. 13 alone.

The processor may output data corresponding to the hologram, in any suitable manner. The hologram can be encoded on to the display device. As a result, the display device will be tuned to modulate light in a manner that enables the virtual image to be perceived by the viewer, at the required virtual image distance, without the formation of any ghost images.

The method 1400 may be carried out substantially simultaneously (or in very quick succession) for each of a plurality of virtual points within a virtual image, so that a suitable hologram for the whole virtual image may be derived and encoded on to the display device very quickly, for a given viewing set up and for particular numerical measurements and constraints. If anything changes that might affect the identification and/or the required tuning of the display device, the method may be re-run. The processor may be configured to re-run the method on a time-controlled loop, and/or in response to a signal indicating that a change has occurred, and/or when the content or identity of the required virtual image changes. The processor may include, or may be in communication with, a memory, for storing previously-calculated data. For example, a look up table or other storage means may be provided, which indicates the active area(s) of the display device, for a particular virtual image or virtual point, under a specific set of measurements and/or constraints.

The method 1400 may be run (or re-run) very quickly, in order to display a number of different virtual images in quick succession, and/or to respond accurately to changes in conditions such as movement of the user. Although only one eye is shown in the system of FIG. 12, the method 1400 can be configured to consider both the viewer's eyes. Moreover, although certain of the descriptions above may refer to an aperture width, it will be appreciated that a pupil (and most other apertures, for viewing entities) is two dimensional and can change size in each of those two dimensions. The method 1400 may be configured to take two-dimensional aperture size, and changes thereto, into consideration.

Hologram Calculation—Example 2

The methods of FIGS. 13 and 14 above comprise point cloud hologram calculation methods, however the recognitions made by the present inventors extend to hologram calculation by any suitable method, including Fresnel and Fourier hologram calculation methods. In other words, the present inventors have recognised that a hologram may be calculated in one of a number of different possible ways, and displayed on a relatively small display device, located at a relatively large distance from the viewer, with a waveguide suitably located between the display device and the viewer, in order for the viewer to see a virtual image at a finite distance upstream of the display device, without ghost images. Moreover, this can be done by projecting the light of the hologram directly to the viewer's eye, without an interim holographic reconstruction being formed.

Figure 15:
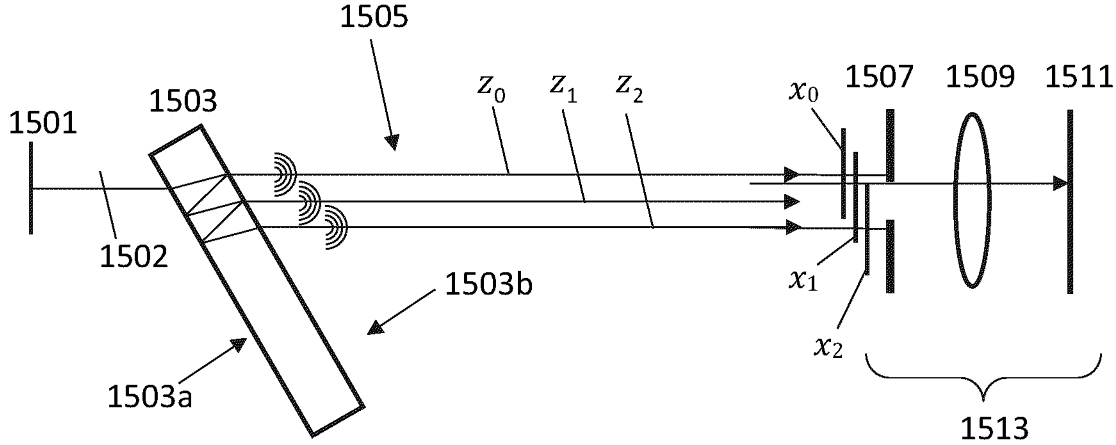
FIG. 15 shows an optical system in accordance with embodiments.
Figure 15:
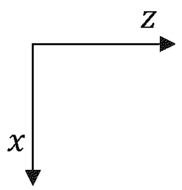

For example, the inventors have devised a method of calculating hologram for the optical system shown in FIG. 15. Importantly, the display device is relatively small and the projection distance is relatively long. The hologram is projected directly to the viewing system and the method is capable of implementation in real-time. As with the arrangements shown in FIG. 6A et seq, above, the relatively small size of the display device and relatively long projection distance necessitate a pupil expander. The method addresses the different paths through the pupil expander, and takes into account the size and shape of the entrance aperture(s) of the viewing system. In addition, the method allows image content to appear at different distances from the viewing system and/or plural distances, optionally, at the same time—e.g. using one hologram. The method allows image content to appear downstream of the display device and upstream of the display device, optionally, at the same time—e.g. using one hologram.

FIG. 15 shows a spatial light modulator 1501 operable to display a hologram of an image. In this embodiment, the spatial light modulator 1501 is a liquid crystal on silicon device arranged to module the phase of received light. The spatial light modulator 1501 is illuminated by at least partially coherent light from a light source (not shown). The light source may be a laser diode. The spatial light modulator 1501 outputs light that is spatially modulated in accordance with the display hologram. FIG. 15 shows one light ray 1502 of the spatially modulated light, by way of example. It will be appreciated that there will typically be multiple rays of spatially modulated light, output by the spatial light modulator 1501. The spatially modulated light is received by a pupil expander 1503. The pupil expander 1503 is inclined relative to the plane of the display device 1501. The pupil expander 1503 therefore receives light at non-normal incidence. The incident angle (the angle the optical axis makes with the pupil expander) may be less than 25 degrees such as to 20 degrees. The pupil expander comprises an input surface 1503*a* that receives the spatially modulated light and an output surface 703*b*. The input surface 1503*a* and output surface 1503*b* are substantially parallel and elongate in a direction of pupil expansion. The input surface 1503*a* comprises at least a portion that is substantially fully reflection (e.g. R=1). The output surface 1503*b* comprises at least a portion that is highly reflective but partially transmissive (e.g. R=0.9 and T=0.1). The reflective surfaces are arranged such that spatially modulated light bounces back and forth therebetween, and light is emitted at a plurality of points along the output surface 1503*b*, as described above with reference to waveguide 608 of FIG. 6A. In this embodiment, the pupil expander is substantially elongate. The pupil expander provides pupil expansion in one-direction—namely, the elongate direction—but the present disclosure may be expanded to include the presence of a second pupil expander arranged to expand the pupil in an orthogonal direction.

FIG. 15 shows how the light ray 1502 has been effectively replicated twice to form three propagation paths 1505 each associated with a different distance, $Z_0$, $Z_1$ and $Z_2$. The shortest propagation path corresponds to $Z_0$ and, in this example, light that has passed through the waveguide without any internal reflections. The middle-distance propagation path of the three shown corresponds to $Z_1$ and two internal reflections in the pupil expander (one by each surface). The longest propagation path shown corresponds to $Z_2$ and four internal reflections in the pupil expander (two by each surface). The planes $x_0$, $x_1$ and $x_2$ show the spatial extent of the light field associated with each of the three propagation paths, $Z_0$, $Z_1$ and $Z_2$, respectively. More specifically, FIG. 15 shows how the three planes $x_0$, $x_1$ and $x_2$ are offset from each other in the x-direction FIG. 15 further shows a viewing system 1513 comprising an entrance pupil 1507, a lens 1509 and a light sensor 1511. In embodiments, the viewing system 1513 is a human eye and the light sensor 1511 is the retina of the eye. FIG. 15 shows how only some of the light field associated with each propagation path passes through the entrance 1507. FIG. shows the light ray associated with centre of the middle-distance propagation path passing through the centre of the entrance pupil 1507. But, for example, the light ray associated with the centre of the light field of shortest propagation path is blocked by a top portion of the aperture 1507. However, other light rays associated with the light field of the shortest propagation path can pass through the aperture 1507. The light ray associated with the centre of the light field of the longest propagation path is blocked by a lower portion of the aperture 1507. However, other light rays associated with the light field of the longest propagation path can pass through the aperture 15807 too.

Light passing through aperture 1507 is focused by lens 1509 onto the light sensor 1511. The plane of the light sensor 1511 is substantially parallel to the plane of the display device 1501, and is therefore inclined relative to the elongate dimension of the pupil expander 1503 too.

FIG. 15 shows three possible light propagation paths of a single ray 1502 of spatially modulated light by way of example only. The present disclosure is not limited by the number of propagation paths. That is, as the skilled person will appreciate from the following description, the method may be extended to factor-in any number of light propagation paths. Likewise, it is not essential that the pupil expander is inclined relative to the display plane and sensor plane. The present inventors have devised a method, described below in relation to FIG. 16, which can be used to calculate a suitable hologram to ensure the spatially modulated light reaches the viewer's eye correctly, for a range of different pupil expander set ups and for any possible number of bounces of light within the pupil expander, and therefor for any number of light propagation paths. Importantly, it accounts for the size and shape of the entrance aperture of a viewing system, so that all the required light of an image reaches the viewer.

Figure 16:
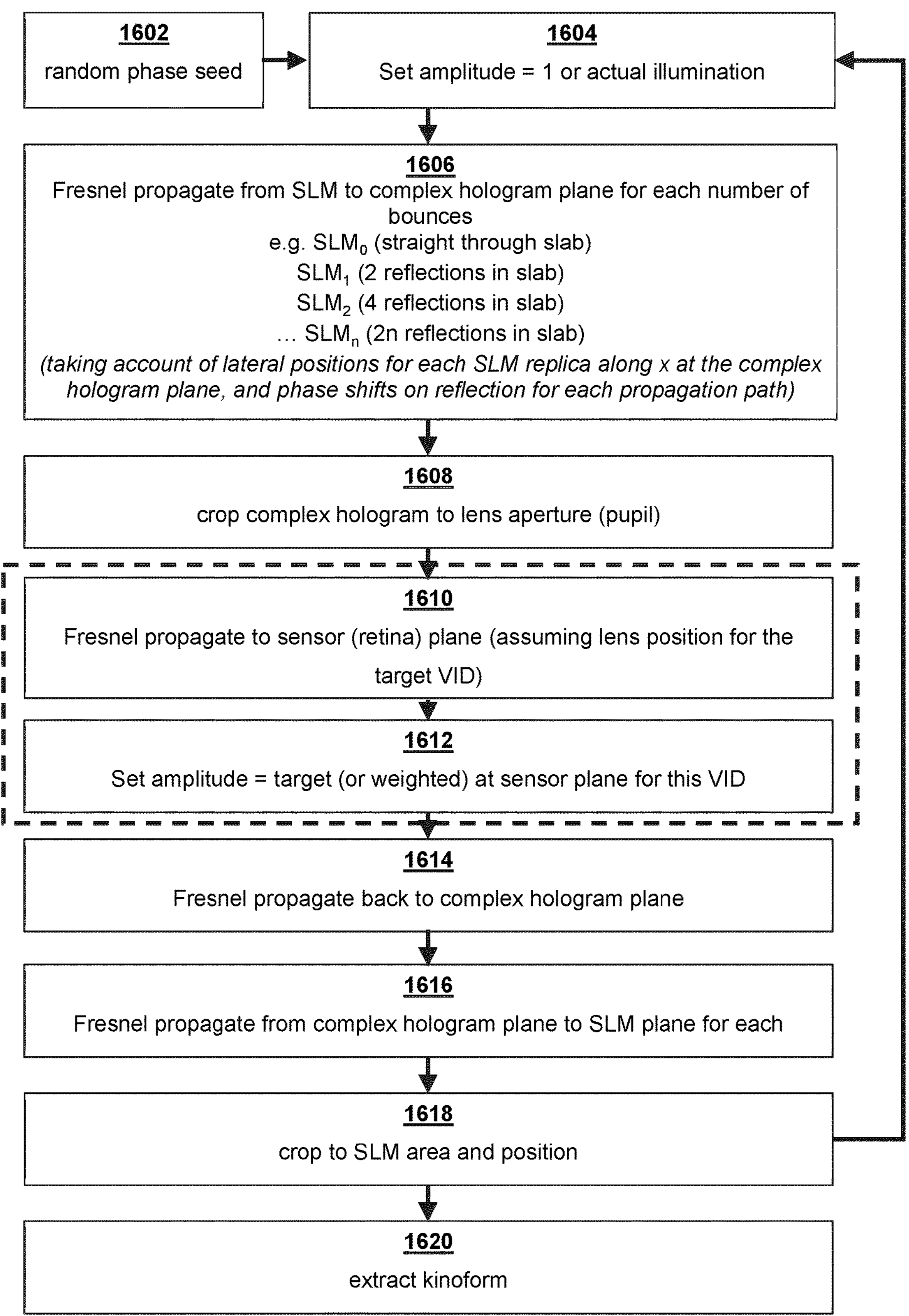
FIG. 16 is a flowchart showing the steps of a method in accordance with embodiments.

FIG. 16 is a flowchart showing the steps of the method. The method resembles a Gerchberg-Saxton type algorithm which uses mathematical transforms back and forth between the image plane and hologram to converge on a phase hologram corresponding to the image, which may be a virtual image, and which may be formed at a finite distance upstream of the spatial light modulator 1501. The amplitude component of the light field after each propagation to the image plane or hologram plane is modified or constrained but the phase component is preserved.

A zeroth stage of the method comprises steps 1602 and 1604. The zeroth stage comprises forming a zeroth complex light field. Step 1602 provides a random phase seed forming the phase component of the zeroth complex light field. Step 1604 provides the amplitude component of the zeroth complex light field. The amplitude component may be unity or an amplitude distribution representative of the light of a light source that will be used to reconstruction the image from the hologram In step 1606, the zeroth complex light field is Fresnel propagated from the spatial light modulator 1501 (i.e., from the hologram plane) to the entrance pupil 1507 of the viewing system 713 (more specifically, to the plane containing the entrance pupil 1507 of the viewing system 713). Again, this embodiment refers to Fresnel propagation as just one example of a number of different mathematical transforms that may be used without departing from the spirit or scope of this disclosure. Step 1606 is performed for each number of bounces or internal reflections provided by the pupil expander 1503 to form a complex light field in respect of each light propagation path. Step 1606 includes taking account of the lateral position of the complex light field in the x-direction at the plane of the entrance pupil 1507, and phase shifts on each reflection within the pupil expander 1503. The different complex light fields may be combined, for example, by addition. The first stage further comprises step 1608 of cropping the combined complex light field in accordance with the size and shape of the entrance pupil 1507 to form the first complex light field at the entrance pupil 1507.

A second stage of the method comprises steps 1610 and 1612. In step 1610, a second complex light field is determined by propagating the first complex light field from the entrance pupil through lens 1509 and to the plane of the light sensor 711. Step 1612 comprises modifying the amplitude component of the complex light field arriving at the light sensor 711. More specifically, step 1612 comprises replacing the amplitude component of the complex light field with the amplitude component of the target image or an amplitude component based on that of the target image such as a weighted version of the amplitude component of the target image. The position of the lens 1509 used in the propagation determines the image distance—that is, wherein space the image content will appear. In some embodiments, the image is a virtual image and this distance may be referred to as a virtual image distance, "VID".

Advantageously, the method disclosed herein allows image content to be formed at a plurality of different image distances—e.g. multiple VIDs—using the same hologram. The inventors identified that this may be achieved by repeating the second stage for each image distance by considering different positions of lens 1509 in the z-direction. The complex light fields determined in accordance with this approach for each different image distance may be combined by addition, for example.

A third stage of the method comprises step 1614 in which the second complex light field is propagated back to the entrance pupil 1507 via the lens 1509. This may be referred to as a reverse propagation merely to reflect that the light is travelling in the opposite z-direction. In some embodiments, the reverse propagation is a mathematical inverse of the corresponding "forward" propagation. The third stage also comprises cropping the propagated light field in accordance with the size and shape of the entrance pupil 1507 to form the third complex light field.

A fourth stage comprises steps 1616 and 1618. In step 1616, the light is propagated back to the plane of the spatial light modulator 1502 via the plurality of light propagations paths of the pupil expander, in the matter described above in relation to the first stage—but in the opposite light direction, of course (i.e., a "reverse" propagation). Step 1618 comprises cropping the propagated light field in accordance with the size and position of the active/pixel area of the display device. The number of complex values of each complex light field may be equal or less than the number of pixels of the display device.

Figure 17A:
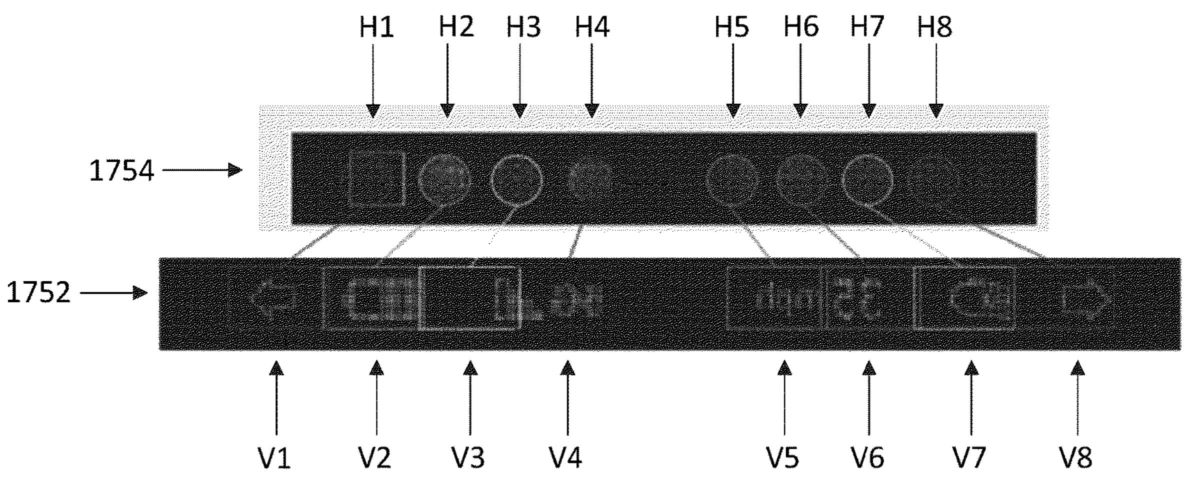
FIG. 17A shows an image comprising a plurality of image areas (bottom) and corresponding hologram comprising a plurality of hologram components (top)
Figure 17B:
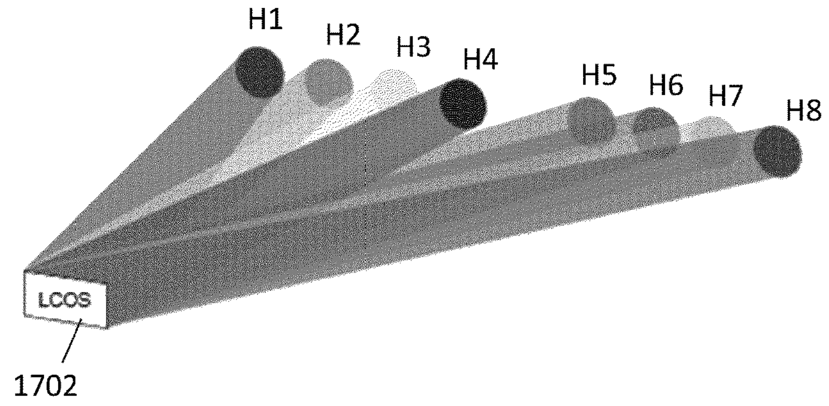
FIG. 17B shows a hologram, in accordance with the present disclosure, characterised by the routing or channeling of holographically encoded light into a plurality of discrete hologram channels.

Step 1620 comprises extracting the hologram from the fourth complex light field. The hologram may comprise the phase values of the fourth complex light field in which case the hologram may be referred to as a kinoform. The method may equally start at the image plane (i.e., the third stage). At least one iteration of each stage is required in accordance with this disclosure. FIGS. 17A and 17B describe the hologram formed by this method, and by the methods of FIGS. 13 and 14.

Channeling Hologram

The present inventors have found that, regardless of the method via which it is calculated, a hologram (or, "kinoform", or "diffractive structure") that is calculated according to the present disclosure has unique properties, which are not observable or achievable using conventional methods of hologram calculation.

In summary, a hologram that is calculated in accordance with the present disclosure enables a display device, for example such as but not limited to an LCOS, on which it is displayed and illuminated, to output channels of spatially modulated light, wherein each channel corresponds to a different respective portion of the corresponding image. This unique channeling enables the display device to work in conjunction with a suitable pupil expander such as a waveguide, in order to allow a viewer to accurately see the whole image via the relatively small aperture of their eye, even when the viewing distance is relatively large and when the display device is relatively small, and without being required to move their eye. For example, a virtual image located at a finite distance upstream of the display device may be viewed (correctly, and in its entirety) at a relatively large distance, even though both the aperture of the viewer's eye and the display device on which the hologram is displayed are relatively very small. This has not previously been achievable, either using conventional holography or using non-holographic techniques.

In accordance with an aspect of this disclosure, the inventors found that, when the hologram is calculated using a "point cloud" method as detailed above, the light from each virtual image point is restricted in accordance with a different, corresponding primary contributory area of the display device. The inventors further recognised that this means that light from different parts of the virtual image (i.e., different virtual image points) follows different optical paths through the system. Similarly, in accordance with an aspect of this disclosure, the inventors found that, when the hologram is calculated using Fresnel propagation, such as via the method shown in FIG. 16 above, spatially modulated (I.e., "holographic") light corresponding to different respective portions of the image follow different respective optical paths. Thus, the inventors recognised that the hologram (regardless of how it is calculated) may be employed to direct each of those optical paths to the viewer's eye simultaneously, thereby enabling the viewer to receive all the holographic light that is needed for their eye/brain to reconstruct the entirety of the image, without moving their eye(s) or making any other physical changes. As shown in the detailed examples above, a waveguide or other pupil expander may be used in conjunction with a display device, displaying the calculated hologram(s), in order to achieve this.

In an embodiment illustrated by FIGS. 17A and 17B, the inventors configured an optical system to display a virtual image that comprises a plurality of discrete virtual image components or areas, to aid with understanding of the unique properties of holograms as disclosed herein. However, the present disclosure is equally applicable to the calculation and display of holograms corresponding to images that have continuous (i.e., non-discrete) image content, and/or to holograms of images having any number/size/division of discrete image portions. In FIGS. 17A and 17B, in simple terms, (i) the virtual image comprises a plurality of discrete virtual image components or areas and (ii) light of each virtual image component is associated with a different number of bounces/reflections within the waveguide 1708. However, in some other embodiments, it is possible that light of two or more discrete virtual image components would undergo the same number of bounces within the waveguide.

FIG. 17A shows an image 1752 for projection comprising eight discrete image areas/components, V1 to V8. FIG. 17A shows eight image components by way of example only and the image 1752 may be divided into any number of components. FIG. 17A also shows the encoded light pattern (I.e., the pattern of holographic light) 1754 that is formed when the hologram (calculated as disclosed herein) is suitably displayed and illuminated. The encoded light pattern 1754 can reconstruct the image 1752 when transformed by the lens of a suitable viewing system, such as the viewer's eye(s). The encoded light pattern 1754 comprises first to eighth components or channels, H1 to H8, corresponding to the first to eighth image components/areas, V1 to V8. The hologram may therefore be characterised by the channeling of holographic light that it performs. This channeling of light occurs owing to the way is has been calculated, and is illustrated in FIG. 17B. Specifically, the hologram in accordance with this disclosure directs the holographic light into a plurality of discrete channels, which may be formed on a plane as discrete respective areas. The discrete areas are discs in the example shown but other shapes are envisaged. As detailed above, the hologram is calculated (e.g., cropped) specifically with the size/shape of the light field at the display device and/or the size/shape of the light field at the viewing aperture(s) in mind. Therefore, the size and shape of the optimum disc may be related to the size and shape of the entrance pupil of the viewing system.

It should be understood from the present disclosure that this type of hologram may be calculated by any method and a core recognition by the inventors is that this type of hologram can be used to deliver a relatively large field of view using a relatively small display device. The hologram behaviour disclosed herein is synergistic with a hologram replicator such as a pupil expander. The holographic system disclosed herein is particularly synergistic with head-up display.

The channels of holographic light that are output by the hologram effectively decompose the image content (of the image that is to be holographically reconstructed by the viewer) by angle. This can be understood further by comparison to the optical arrangement of FIG. 4 hereabove, in which light ray bundles from a plurality of discrete locations on a real image 401 travel to the aperture (or, viewing window) 402 at a plurality of discrete corresponding angles, but light from only one of those bundles can travel through the viewer's eye, at any given eye position. A hologram that is calculated as described herein, and displayed by a suitable display device, can form a holographically reconstructed virtual image, to mimic the presence of that image 401 (or, indeed, of any desired image/object) at a desired image distance. However, in a notable advantage over the optical system of FIG. 4, and over conventional holographic systems, the hologram calculated as described here in enables the entire image to be seen or perceived by the viewer even when the display device is relatively small and when an entrance aperture of the viewing system, such as the viewer's eye, is relatively small, and when the viewing distance is relatively large. In other words, and by way of non-limiting example, the hologram would enable all of the five light ray bundles depicted in FIG. 4 to reach the viewer simultaneously, thus completely forming the desired virtual image.

Importantly, such a hologram, when suitably displayed and illuminated, causes the display device to output channels of holographic light, wherein each channel of holographic light corresponds to an angle (or, in some cases, a bundle of angles) at which light from a respective part of the desired image/object would arrive at the display device. Thus, it can be said that the channels of holographic light correspond to different respective angular portions of image content. This is not the case for conventional holograms. Moreover, unlike unmodulated light from a real image/object, or spatially modulated light formed from a conventional hologram, the channels of holographic light disclosed herein are specifically configured so that they can be guided, by a suitable waveguide or other pupil expander, located between the display device and the viewer, to ensure that each of the channels—and, so, holographic light corresponding to each (i.e., every) part of the image—may be received simultaneously by the viewer. Moreover, each channel may be received only once, at least in some embodiments.

Figure 17C:
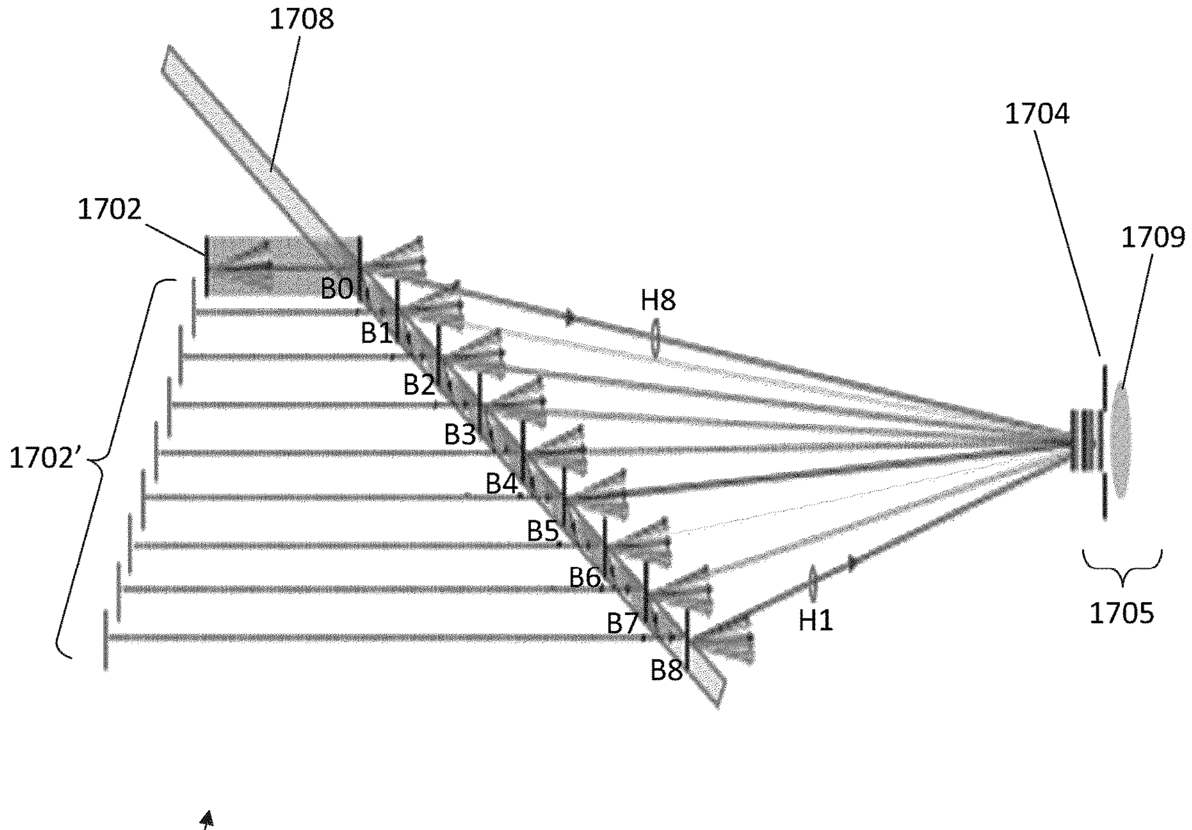
FIG. 17C shows an optimised system arranged to route the light content of each hologram channel through a different optical path to the eye.

FIG. 17C shows an improved viewing system 1700, in accordance with the recognitions illustrated in FIGS. 17A and 17B. The method 1300 of FIG. 13 or the method 1400 of FIG. 14 or the method of FIG. 16, or any other suitable method, may be applied to calculate the hologram in the scheme illustrated by FIGS. 17A to 17C.

The viewing system 1700 comprises a display device, which in this arrangement comprises an LCOS 1702. The LCOS 1702 is arranged to display a modulation pattern (or 'diffractive pattern') comprising the hologram and to project light that has been holographically encoded towards an eye 1705 that comprises a pupil that acts as an aperture 1704, a lens 1709, and a retina (not shown) that acts as a viewing plane. There is a light source (not shown) arranged to illuminate the LCOS 1702. The light source may for example comprise a laser diode. The hologram is configured such that the entire hologram can be illuminated by a single light ray (or, a single bundle of light rays). There is no requirement for multiple light sources or, for example, for a plurality of light rays of different respective wavelengths to illuminate the hologram, in order for it to function as described herein.

The lens 1709 of the eye 1705 performs a hologram to image transformation. There is therefore no holographic reconstruction of the image between the LCOS and the eye 1705.

The viewing system 1700 further comprises a waveguide 1708 positioned between the LCOS 1702 and the eye 1705. The projection distance in FIG. 17C may be relatively large. However, as described in relation to previous Figures, the presence of the waveguide 1708 enables all angular content from the LCOS 1702 to be received by the eye 1705, even at this relatively large projection distance. This is because the waveguide 1708 acts as a pupil expander, in a manner that has been described hereabove.

Additionally, in this arrangement, when the LCOS 1702 has been encoded in accordance with the methods described herein, the waveguide 1708 can be oriented at an angle with respect to the LCOS 1702 in order to establish a unique relationship, between the light from the LCOS 1702 and the virtual image that the viewer will perceive. The size, location, and position of the waveguide 1708 are configured to ensure that light from each holographic channel—and, so, light from each part of the virtual image—enters the waveguide 1708 and is guided along its elongate axis, bouncing between the substantially planar surfaces of the waveguide 1708. Each time the light reaches the second planar surface (nearest the eye 1705), some light is transmitted, and some light is reflected.

FIG. 17C shows a total of nine "bounce" points, B0 to B8, along the length of the waveguide 1702. The reader will notice that the centre of the image 1752 is kept blank. FIG. 17C shows zeroth to ninth light "bounce" or reflection points, B0 to B8, within the waveguide. Although light relating to all points of the image (V1-V8)—I.e., light of each of the eight holographic light channels H1 to H8—is transmitted out of the waveguide at each "bounce" from the second planar surface of the waveguide 1708, only the light from one of angular part of the image (e.g. light of one of the channels, H1 to H8, which corresponds to a specific respective one of the image portions, V1 to V8) has a trajectory that enables it to reach the eye 1705, from each respective "bounce" point, B0 to B8. Moreover, light from a different channel—and, therefore, light from a different respective angular part of the image, V1 to V8—reaches the eye 1705 from each respective "bounce" point, in this embodiment. FIG. 17C shows light of all the different holographic light channels being emitted at each "bounce" point, (depicted by a plurality of short arrows at each transmission point), but then only shows the optical path, to the eye 1705, of the respective channel—which corresponds to a unique respective image portion (I.e., to unique respective angular image content) that will actually reach the eye 1705 from that bouncepoint. The channel whose optical path is shown as reaching the eye for each bouncepoint is the channel that will contribute a respective portion of the virtual image, from that respective part of the waveguide. For example, for the zeroth bounce, B0, the light that is transmitted by the waveguide 1708 is simply refracted and does not undergo any reflections therein. Light of the eighth holographic channel, H8, reaches the eye from the zeroth bounce, B0. For the next bounce B1, the light that is transmitted by the waveguide 1702 undergoes one bounce therein, before transmission. Light from the seventh hologram, H7, reaches the eye from the next bounce, B1. This continues in sequence until the light that is transmitted by the waveguide 1708 at the final bounce, B8, has undergone eight bounces, before being transmitted and reaching the eye 1705, and comprises light encoded in accordance with the first hologram, H1. In this arrangement, light from each channel will reach the viewer simultaneously—one each from a plurality of different respective bouncepoints on the waveguide. Thus, the viewer will receive holographic light corresponding to the entire virtual image at the same time, without moving their eye or making any other changes, even though their eye and the display device are both relatively very small and the viewing distance is relatively large.

In the example shown in FIGS. 17A to 17C, light of only one image area reaches the eye from each bounce point. A spatial correlation between areas of the virtual image and their associated bounce point on the waveguide is therefore established—when the hologram is determined as described herein. In some other examples, there may be relatively small overlaps such that one region of the image comes from two adjacent transmission points, and thus is comprised within two adjacent discs of light that propagate from the waveguide, towards the viewing plane.

Thus, the recognitions made by the inventors, and the methods and arrangements described herein, can enable a diffractive pattern (or, light modulation pattern) comprising a hologram to be generated that, when displayed on an LCOS or other suitable display device, can enable the spatially modulated light to be emitted therefrom effectively in a plurality of 'discs', or channels of holographic light, each of which corresponds to (more specifically, encodes) a different respective part of the corresponding virtual image.

Thus, improved methods and arrangements are described herein that enable holograms to be calculated, and to be displayed on a suitable display device, in a manner that enables clear images to be seen, by a viewer, when the display device is illuminated by a suitable light source. The images that the viewer sees can be free of ghosts and may, at least in some embodiments, be made brighter by the contribution of light, which would conventionally have contributed to a ghost image, instead contributing to the single main image. Moreover, they enable a viewer to see an image, such as a virtual image, at a finite distance from the display device (rather than at infinity) even though the display device and the viewer's viewing aperture(s) (I.e., eye(s)) are relatively very small and the viewing distance is relatively large.

The improved methods and arrangements described herein can be carried out in real-time and may be repeated, for example on a very rapid basis, to accommodate change in viewing aperture location/position. They may be implemented for more than one viewing aperture such as for two eyes. They may be repeated, for example on a very rapid basis, to enable the display of a plurality of different holograms, and thus the viewing of a plurality of different corresponding images, in succession and/or in a sequence, series, pattern or loop.

The improved methods and arrangements described herein can be implemented in a variety of different applications and viewing systems. For example, they may be implemented in a head-up-display (HUD). In an improvement over many conventional HUDs, in which virtual images are formed at infinity, the improved methods and arrangements described herein can be implemented for creating virtual images at finite image distances—which can be selected and tuned by a suitable controller—whilst still eliminating ghost images.

Although virtual images, which require the eye to transform received modulated light in order to form a perceived image, have been discussed herein, the improved methods and arrangements described herein can be applied to real images.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode.

The system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affected by the so-called zero order problem which is a consequence of the diffractive nature of using a pixelated spatial light modulator. Such zero-order light can be regarded as "noise" and includes for example specularly reflected light, and other unwanted light from the SLM.

In embodiments, only the primary replay field is utilised and system comprises physical blocks, such as baffles, arranged to restrict the propagation of the higher order replay fields through the system.

In embodiments, the holographic reconstruction is colour. In some embodiments, an approach known as spatially-separated colours, "SSC", is used to provide colour holographic reconstruction. In other embodiments, an approach known as frame sequential colour, "FSC", is used.

The method of SSC uses three spatially-separated arrays of light-modulating pixels for the three single-colour holograms. An advantage of the SSC method is that the image can be very bright because all three holographic reconstructions may be formed at the same time. However, if due to space limitations, the three spatially-separated arrays of light-modulating pixels are provided on a common SLM, the quality of each single-colour image is sub-optimal because only a subset of the available light-modulating pixels is used for each colour. Accordingly, a relatively low-resolution colour image is provided.

The method of FSC can use all pixels of a common spatial light modulator to display the three single-colour holograms in sequence. The single-colour reconstructions are cycled (e.g. red, green, blue, red, green, blue, etc.) fast enough such that a human viewer perceives a polychromatic image from integration of the three single-colour images. An advantage of FSC is that the whole SLM is used for each colour. This means that the quality of the three colour images produced is optimal because all pixels of the SLM are used for each of the colour images. However, a disadvantage of the FSC method is that the brightness of the composite colour image is lower than with the SSC method—by a factor of about 3—because each single-colour illumination event can only occur for one third of the frame time. This drawback could potentially be addressed by overdriving the lasers, or by using more powerful lasers, but this requires more power resulting in higher costs and an increase in the size of the system.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A diffractive structure arranged to spatially modulate light transformable by a viewing system into an image, wherein the diffractive structure is configured to route light into a plurality of hologram channels, each hologram channel corresponding to a different sub-area of the image, wherein the diffractive structure comprises a plurality of pixels;

wherein the diffractive structure is arranged to spatially modulate light in accordance with a hologram of an image;

wherein the diffractive structure is arranged to divide content of the image by angle such that a central axis of each hologram channel propagates from the diffractive structure at different respective angles;

wherein the diffractive structure is arranged such that each pixel of the diffractive structure contributes light to each of the hologram channels.

2. A diffractive structure as claimed in claim 1 wherein each hologram channel substantially comprises spatially modulated light in accordance with a respective different sub-area of the image.

3. A diffractive structure as claimed in claim 1 arranged to spatially modulate the phase of light.

4. A diffractive structure as claimed in claim 1 arranged to route light through a waveguide.

5. A diffractive structure as claimed in claim 4 wherein the waveguide is arranged for pupil expansion.

6. A diffractive structure as claimed in claim 1 wherein a cross-sectional shape of the light pattern formable by each hologram channel substantially corresponds to the shape of an entrance aperture of the viewing system.

7. A diffractive structure as claimed in claim 1 wherein the hologram channels are spatially separated or at least partially spatially separated.

8. A system comprising the diffractive structure of claim 1, a waveguide arranged to receive the spatially modulated light from the diffractive structure and a viewing system arranged to receive the spatially modulated light via the waveguide.

9. A system as claimed in claim 8 arranged such that light of each hologram channel follows a different optical path from the diffractive structure to the viewing system.

10. A system as claimed in claim 9 wherein the different optical paths comprise a different number of reflections within the waveguide.

11. A system as claimed in claim 9 wherein the different optical paths are different lengths.

12. A system as claimed in claim 9 where the different optical paths pass through the entrance aperture of the viewing system at different respective angles.

13. A system as claimed in claim 9 wherein the waveguide is arranged so that all hologram channels are routed through the entrance aperture of the viewing system at any viewing position on a viewing plane.

14. A system as claimed in claim 13 wherein the waveguide only routes each hologram channel via one optical path to the viewing system for each permitted viewing position.

15. A system as claimed in claim 8 wherein at least two hologram channels of the plurality of hologram channels are partially overlapping at the entrance aperture of the viewing system.

16. The diffractive structure of claim 1 wherein the diffractive structure is a kinoform or hologram.

17. A method of calculating a hologram of an image, the method comprising at least one step including cropping light paths during calculation in accordance with the entrance pupil of the viewing system to form a hologram that, when illuminated, forms spatially modulated light, wherein continuous light channels of the spatially modulated light correspond with continuous regions of the image, wherein the hologram comprises a plurality of pixels;

wherein the hologram is arranged to divide content of the image by angle such that a central axis of each hologram channel propagates from the hologram at different respective angles; and wherein the hologram is arranged such that each pixel of the hologram contributes light to each of the hologram channels.

18. A method of spatially modulating light to provide spatially modulated light transformable by a viewing system into an image, the method comprising:

illuminating a diffractive structure with light; and spatially-modulating light using the diffractive structure, wherein the diffractive structure routes the spatially-modulated light into a plurality of hologram channels, each hologram channel corresponding to a different sub-area of the image, wherein the diffractive structure comprises a plurality of pixels;

wherein the diffractive structure is spatially modulates light in accordance with a hologram of an image;

wherein the diffractive structure divides content of the image by angle such that a central axis of each hologram channel propagates from the diffractive structure at different respective angles;

wherein each pixel of the diffractive structure contributes light to each of the hologram channels.

* * * * *